US011905389B2

(12) United States Patent
Beall et al.

(10) Patent No.: US 11,905,389 B2
(45) Date of Patent: Feb. 20, 2024

(54) MOLECULARLY SELF-ASSEMBLING NANOCOMPOSITE BARRIER COATING FOR GAS BARRIER APPLICATION AND FLAME RETARDANCY

(71) Applicant: Texas State University—San Marcos, San Marcos, TX (US)

(72) Inventors: Gary W. Beall, San Marcos, TX (US); Ray G. Cook, New Braunfels, TX (US); Maedeh Dabbaghianamiri, San Marcos, TX (US)

(73) Assignee: Texas State University—San Marcos, San Marcos, TX (US)

( * ) Notice: Subject to any disclaimer, the term of this patent is extended or adjusted under 35 U.S.C. 154(b) by 41 days.

(21) Appl. No.: 15/874,942

(22) Filed: Jan. 19, 2018

(65) Prior Publication Data
US 2018/0215896 A1    Aug. 2, 2018

Related U.S. Application Data

(63) Continuation-in-part of application No. 14/811,002, filed on Jul. 28, 2015, now abandoned.
(Continued)

(51) Int. Cl.
*C08K 3/36* (2006.01)
*C08K 3/016* (2018.01)
(Continued)

(52) U.S. Cl.
CPC ............ *C08K 3/36* (2013.01); *B05D 1/02* (2013.01); *C08J 7/0423* (2020.01); *C08J 7/0427* (2020.01);
(Continued)

(58) Field of Classification Search
CPC . C08K 3/36; C08K 3/016; C08K 3/34; C08K 3/346; C09D 7/67; C09D 5/024;
(Continued)

(56) References Cited

U.S. PATENT DOCUMENTS 6,083,605 A * 7/2000 Harada ................. C08J 7/0427
428/143
6,486,253 B1 11/2002 Gilmer et al.
(Continued)

FOREIGN PATENT DOCUMENTS

WO    WO-2013129515 A1 * 9/2013 ........... B32B 27/308

OTHER PUBLICATIONS

Schmid et al. "Water Repellence and Oxygen and Water Vapor Barrier of PVOH-Coated Substrates before and after Surface Esterification" Polymers 2014, 6, 2764-2783.*
(Continued)

*Primary Examiner* — Robert S Walters, Jr.
(74) *Attorney, Agent, or Firm* — Kowert, Hood, Munyon, Rankin & Goetzel, P.C.

(57) ABSTRACT

Disclosed is a transparent self-assembling polymer clay nanocomposite coating that is useful in food, drink and electronic packaging as a gas barrier and on textiles and clothing as a flame retardant coating. The coating includes two main components a water dispersible polymer and a sheet like nanoparticle. The coatings may be applied to any substrate. The coatings are applied sequentially with polymer being applied first followed by the nanoparticles. This sequence results in the self-assembly of a highly ordered nanocomposite film that exhibits high barrier properties and flame retardancy. The desired level of gas barrier or flame retardancy desired can be adjusted by the number of bilayers applied.

15 Claims, 15 Drawing Sheets

Related U.S. Application Data

(60) Provisional application No. 62/544,266, filed on Aug. 11, 2017, provisional application No. 61/999,455, filed on Jul. 28, 2014.

(51) Int. Cl.

| | | |
|---|---|---|
| *C08L 39/06* | (2006.01) | |
| *C09D 5/02* | (2006.01) | |
| *B05D 1/02* | (2006.01) | |
| *C08L 29/04* | (2006.01) | |
| *C09D 129/04* | (2006.01) | |
| *C09D 5/18* | (2006.01) | |
| *C09D 7/40* | (2018.01) | |
| *C09D 139/06* | (2006.01) | |
| *D06M 23/08* | (2006.01) | |
| *D06M 15/356* | (2006.01) | |
| *D06M 11/79* | (2006.01) | |
| *D06M 15/333* | (2006.01) | |
| *C08J 7/04* | (2020.01) | |
| *C01B 33/22* | (2006.01) | |
| *C01B 33/26* | (2006.01) | |
| *B05D 7/00* | (2006.01) | |
| *B05D 1/26* | (2006.01) | |
| *B05D 7/04* | (2006.01) | |
| *C08K 3/34* | (2006.01) | |
| *D06M 23/06* | (2006.01) | |
| *D06M 101/06* | (2006.01) | |

(52) U.S. Cl.
CPC .............. *C08K 3/016* (2018.01); *C08L 29/04* (2013.01); *C08L 39/06* (2013.01); *C09D 5/024* (2013.01); *C09D 5/027* (2013.01); *C09D 5/18* (2013.01); *C09D 7/67* (2018.01); *C09D 129/04* (2013.01); *C09D 139/06* (2013.01); *D06M 11/79* (2013.01); *D06M 15/333* (2013.01); *D06M 15/3562* (2013.01); *D06M 23/08* (2013.01); *B05D 1/26* (2013.01); *B05D 7/04* (2013.01); *B05D 7/50* (2013.01); *B05D 2203/00* (2013.01); *C01B 33/22* (2013.01); *C01B 33/26* (2013.01); *C08J 2367/02* (2013.01); *C08J 2400/14* (2013.01); *C08J 2429/04* (2013.01); *C08J 2439/06* (2013.01); *C08J 2471/02* (2013.01); *C08K 3/34* (2013.01); *C08K 3/346* (2013.01); *C08L 2201/54* (2013.01); *D06M 23/06* (2013.01); *D06M 2101/06* (2013.01); *D06M 2200/30* (2013.01)

(58) Field of Classification Search
CPC .... C09D 5/027; C09D 129/04; C09D 139/06; C08J 7/0427; C08J 7/0423; C08J 2367/02; C08J 2400/14; C08J 2429/04; C08J 2439/06; C08J 2471/02; B05D 1/02; B05D 1/26; B05D 7/04; B05D 7/50; B05D 2203/00; C08L 29/04; C08L 39/06; C08L 2201/54; D06M 11/79; D06M 15/333; D06M 15/3562; D06M 23/08; D06M 23/06; D06M 2101/06; D06M 2200/30; C01B 33/22; C01B 33/26
See application file for complete search history.

(56) References Cited

U.S. PATENT DOCUMENTS

| | | |
|---|---|---|
| 7,799,395 B2 | 9/2010 | Ebina et al. |
| 8,007,895 B2 | 8/2011 | Ebina et al. |
| 8,206,814 B2 | 6/2012 | Ebina et al. |
| 8,557,033 B2 | 10/2013 | Grondahl et al. |
| 2014/0363661 A1* | 12/2014 | Kaminaga .............. B32B 27/32 428/324 |

OTHER PUBLICATIONS

Choi et al. "Fuzzy Nanoassembly of Polyelectrolyte and Layered Clay Multicomposite toward a Reliable Gas Barrier" Langmuir, 2012, 28, 6826-6831.*

Walther et al. "Large-Area, Lightweight and Thick Biomimetic Composites with Superior Material Properties via Fast, Economic, and Green Pathways" Nano Lett. 2010, 10, 2742-2748.*

Rao et al. "Polymer Nanocomposites with a Low Thermal Expansion Coefficient" Macromolecules, 2008, 41, 935-941.*

* cited by examiner

US 11,905,389 B2

MOLECULARLY SELF-ASSEMBLING NANOCOMPOSITE BARRIER COATING FOR GAS BARRIER APPLICATION AND FLAME RETARDANCY

PRIORITY CLAIM

The present application is a continuation-in-part of U.S. patent application Ser. No. 14/811,002, filed Jul. 28, 2015, which claims priority to U.S. Provisional Application Ser. No. 61/999,455, filed Jul. 28, 2014, both of which are incorporated herein by reference in its entirety. The present application also claims priority to U.S. Provisional Application Ser. No. 62/544,266, filed Aug. 11, 2017, which is incorporated herein by reference in its entirety.

BACKGROUND OF THE INVENTION

1. Field of the Invention

The technical fields of this invention relate to gas barriers for food packaging, beverage containers, electronic packaging for organic light emitting diodes (OLED), and flame retardant coatings for upholstery and clothing.

2. Description of the Relevant Art

In the area of food and beverage packaging the use of thermoplastic polymers has virtually eliminated the use of other forms of packaging when the ingress or egress of oxygen, water vapor or carbon dioxide is of importance. Many of the polymers commonly employed today however don't give shelf lives that retail food markets would like. A good example is carbonated drinks where the shelf life issue is loss of carbonation. Carbonated drinks are normally packaged in polyethylene terephthalate (PET) bottles. These bottles for large volumes of 2 and 3 liter give shelf lives of slightly over 100 days. They however yield substantially shorter shelf lives for small volume containers. This allows glass bottles and aluminum cans to continue to compete with plastic in this segment. There are several other examples where ingress of oxygen presents a big problem for simple single layer packages. The first example is beer which largely must be packaged in glass or aluminum since it is very sensitive to ingress of oxygen. The second example is catsup which currently requires either glass or a 5 to 7 layer bottle to protect the contents from oxygen. In the area of flexible food packaging one solution to barrier films for highly sensitive foods is aluminized coatings on various polymer substrates. These type of packages are commonly utilized for such foods as potato chips and pastries. They yield good barrier properties but they are expensive, produce substantial waste and are opaque. There is clearly a need for packaging that can produce excellent gas barrier and be transparent.

For food articles, such as produce, it is important to extend the shelf life to reduce the waste caused by unpurchased fruit becoming overripe. Highly oxygen sensitive food packaging requires an oxygen transmission rate (OTR) of less than 1 $cc/m^2 \cdot day \cdot atm$ (e.g., for coffee and high-fat snacks) and flexible organic light-emitting devices require an OTR below 10-5 $cc/m^2 \cdot day \cdot atm$. Current methods are not suitable for this application since they either do not significantly improve shelf life, or lack transparency.

There have been many approaches tried to produce high barrier packages that maintain transparency. The first approach has been to form nanocomposites between the polymer normally utilized in the packaging application and an organically modified smectic type nanoparticle. Examples of such efforts include U.S. Pat. No. 6,486,253 where organically modified montmorillonite was exfoliated in PET using melt compounding, WO 93/04117 and W093/04118 discloses a wide range of polymers melt blended with dispersed platelets. There are also examples, such as U.S. Pat. No. 4,739,007, which discusses dispersing clay nanoparticles in a monomer, followed by polymerization, to form nylon 6. In U.S. Pat. No. 4,889,885 the same approach was taken with montmorillonite and polymerization of various vinyl polymers. U.S. Pat. No. 7,619,024 discloses the melt blending of MXD6 polyamide and a polyphenoxy resin with an organically modified montmorillonite to produce a barrier film. This film however is sensitive to heat treatment and will crystalize and become opaque. It is also sensitive to humidity. All of these approaches have had limited utility for several reasons. The first problem is that nanocomposites are limited to the range of 2 to 4% by weight because above this level the nanocomposites start to lose clarity and the physical properties start to degrade. At the upper limit of 4% it is difficult to fully exfoliate the plates which is critical for good barrier properties. With these limitations packages made with these nanocomposites only yield a factor of 2× to 3× improvement in barrier properties.

Another approach to solving this problem has been to develop coatings that are used to treat the substrate polymer package as a post treatment. These approaches include cases where compositions are disclosed where plate like particles are dispersed in the coating. For example, WO 95/26997 discloses the dispersion of mica, glass flakes or aluminum flake into polyepoxide-polyamine barrier coating to improve the barrier. These however give limited improvement and sacrifice clarity. U.S. Pat. Nos. 4,528,235 and 1,018,528 disclose the use of mica, platelet silica, flake glass, and flaked glass at high loadings in polycaprolactam and high-density polyethylene to improve barrier properties. These processes again sacrifice clarity for nominal gains in barrier properties. U.S. Pat. No. 5,840,825 describes a gas barrier coating consisting of a thermoset formulation with platy micron sized particles dispersed into it. The platy material include mica, clay, talc, iron oxide, silica flake, graphite, flaked glass, or flaked thalocyanine. The thermoset polymer is a polyamine and a polyepoxide. These coatings suffer from the same problems as stated above and don't qualify as nanocomposites and don't demonstrate self-assembly. U.S. Pat. Nos. 8,007,895 and 8,206,814 discloses the dispersion of clay into water with a small amount of water soluble resin with subsequent coating onto a substrate followed by drying. The reported coating has a minimum of 70% clay and yields good barrier properties and clarity. This disclosure however doesn't show self-assembly of a highly ordered high barrier coating not requiring pre-mixing of the components.

In the manufacturing of display screens utilizing OLED technology there is a very stringent need for coatings to protect the OLED from oxygen and moisture. The current technology involves the application of as much seven layers of thin glass over the OLED's. This is very expensive and difficult to implement on larger areas. Attempts have been made to produce simpler coatings that exhibit the necessary barrier properties and yet maintain the transparency needed in these displays. An example is U.S. Pat. No. 7,951,726 where it is disclosed that OLEDS can be coated with a photocured resin that is UV cured followed by a coating of two inorganic materials that can include metal oxides, non-metal oxides, nitrides, and salts. The inorganic coating is applied by sputter coating, physical vapor deposition, chemical vapor deposition, or atomic vapor deposition. This is still a very expensive process that is difficult to implement at large scale. This approach doesn't show self-assembly of highly ordered barrier films.

Layer-by-Layer (LbL) deposition techniques may be used to produce materials with useful barrier properties. LbL self-assembly fabrication method allows the design of multilayer ultrathin films. Surface coatings and nanocomposites have been introduced in response to this growing need especially in the biomedical, microelectronics, and flexible packaging industries.

Incorporating nonmaterial into polymers (polymer nanocomposites [PNCs]) improves physical properties, durability, and barrier effect of the base polymer. The permeability to gasses is determined by absorption rate of gas molecules into the matrix at the atmosphere/polymer boundary and diffusion rate of adsorbed gas molecules through the matrix. Since, the filler materials are basically impermeable inorganic crystals, gas molecules must diffuse around them rather than taking a (mean) straight line path that lies perpendicular to the film surface. The amount of oxygen gas that passes through a substance over a given period may be measured by determining the Oxygen Transmission Rate (OTR). Adding impermeable inorganic nanoparticles to bulk polymer films is the common way to reduce OTR.

The tortuous path model can be modeled well for crystalline and semi crystalline polymer nanocomposites. If using amorphous polymer for nanocomposites, these models are not appropriate. There are many examples were amorphous polymers can exceed the barrier performance predicted by this simple model. The region of constrained polymer caused by interaction with the nanoparticle contributes greatly to the gas barrier performance. Thin polymer deposition between clay layers can be considered an expanded state of intercalation.

Currently there is a high level of research focused on preparation of LbL barrier films on different types of substrates and different coating materials and high gas-barrier properties of these flexible films have been studied for many applications such as flexible electronic devices, pharmaceuticals, and food packaging. In traditional ways for making gas barrier films, a substrate is dipped in solutions of polymer repeatedly followed by platy nanoparticle dispersions to create many alternating organic/inorganic layers (usually more than 50). Usually there are rinsing and drying steps between each dipping. This approach produces large amounts of waste rinse water and can be tedious. It makes the LbL technique difficult to implement on a commercial scale and expensive.

A critical issue for the commercial use of this nanocoating technology is reducing the number of processing steps required while achieving high gas barrier. To reduce the permeability of gases such as $O_2$, $CO_2$ and water vapor, several coating techniques can be employed. Different barrier films have been used to test oxygen transmission rate in gas barrier applications such as in food packaging, including common polymers such as oriented polypropylene and polyethylene terephthalate. Polyethylene terephthalate (PET) is used because PET has good gas permeability that can limit the shelf life of some food and drink products. PET (179-micron thickness) has an oxygen transmission rate (OTR) of 8.6 cc/$m^2$·day·atm.

Polymer-clay nanocomposite films produced by LbL assembly have high transparency, and oxygen barrier. But, in traditional producing of these films, many layers are needed to achieve such low oxygen transmission. Reducing the number of processing steps is an important issue for the commercial nanocoating technology.

Imparting flame retardancy to substrates such as upholstery, bedding and sleep ware especially for young children is important. Until now this has been accomplished by adding various types of chemicals that either quench free radical formation or form char layers or both. These chemicals however are not good to expose young children to and, in many cases, produce toxic by-products when burned. A completely different approach to flame retardancy, which addresses the toxicity issue, is the so-called layer by layer technique. These coatings also yield high barrier films. Coatings made by the LBL technique can yield high barrier materials and can impart flame retardancy to substrates without the use of harmful chemicals. The LBL process is very cumbersome and is difficult to implement on a commercial scale since it also produces a lot of waste from the rinse. None of the LBL work shows the self-assembly of highly ordered barrier composites.

It has been known for many years and practiced commercially to treat clays with quaternary ammonium compounds to change them from being hydrophilic to hydrophobic. The number of commercially available quaternary ammonium compounds severely limits the number of polymers that are compatible with those chemistries. More recently in order to form nanocomposites with a wider range of polymers U.S. Pat. No. 5,522,469 discloses a new way to surface modify clays. This method involves the interaction between exchangeable cation on the surface of the clay with a polar group on the organic molecule or polymer via ion-dipole bonding. This patent discloses a whole host of polymers and oligomers that can interact with the smectite clay. It however doesn't anticipate the self-assembly of the highly ordered nanocomposite of this invention.

SUMMARY OF THE INVENTION

It has been unexpectedly discovered that certain polymers in combination with selected nanoparticles will form a self-assembling highly ordered nanocomposite when applied in the proper way that yields extremely high gas barrier performance and flame retardancy and yet is transparent.

The disclosure provides a transparent self-assembling highly ordered polymer nanocomposite coating on a substrate. In embodiments, coated substrate may be extremely impermeable to gases. The coated substrate may comprise a water dispersible polymer including side groups on the backbone that may be polar or ionic and that may be bulky in embodiments. The coated substrate may further comprise a platy nanoparticle with a large aspect ratio that may have small ions or molecules on their surfaces that can readily be exchanged through ion exchange or ion-dipole bonding.

The disclosure further provides a transparent self-assembling highly ordered polymer nanocomposite coating on a substrate that may impart flame retardancy. The coated substrate may comprise a water dispersible polymer that includes side groups on the backbone that may be polar or ionic and that may be bulky in embodiments. The coated nanoparticle may further comprise a platy nanoparticle with a large aspect ratio that may have small ions or molecules on their surfaces that may readily be exchanged through ion exchange or ion-dipole bonding.

The disclosure further provides a transparent self-assembling highly ordered polymer nanocomposite edible coating that may be directly applied to food. In embodiments, the coating may be extremely impermeable to gases and may comprise a water dispersible polymer that includes side groups on the backbone that may be polar or ionic and that may be bulky. The coating may further comprise a platy nanoparticle with a large aspect ratio that may have small ions or molecules on their surfaces that can readily be exchanged through ion exchange or ion-dipole bonding.

The disclosure further provides a transparent self-assembling highly ordered polymer nanocomposite coating that may be applied to protect OLED's from degradation that may be extremely impermeable to gases comprised of a water dispersible polymer that includes side groups on the backbone that may be polar or ionic and that may be bulky and a platy nanoparticle with a large aspect ratio that may have small ions or molecules on their surfaces that may readily be exchanged through ion exchange or ion-dipole bonding.

The disclosure further provides a method of coating an article that includes: obtaining a first coating composition comprising a water soluble polymer and obtaining a second coating composition comprising a smectite clay; and forming a bilayer coating on the article by the method of: coating the article with the first coating composition; and coating the article with the second coating composition. In an embodiment, the first coating composition and/or the second coating composition are applied using a spray coating process.

In an embodiment, the nanocomposite coating may comprise nanoparticles that may be at least one of montmorillonite, hectorite, laponite, and hydrotalcite.

In an embodiment, polymers may be polyvinyl pyrrolidone. In an embodiment, the polymers may be co-polymers of polyvinylpyrrolidone and/or polyvinylalcohol and/or polyvinylacetate, and/or polycationic polymers such as polyamine styrene for the smectite nanoparticles and polyacrylic acid and co-polymers of acrylic acid, sulfated or phosphate polymers for double metal hydroxides.

In an embodiment, the solutions utilized to apply the coating may be less than 1% by weight of a polymer or nanoparticle.

In an embodiment, the solution concentrations may be 0.1% and 0.5% by weight.

In an embodiment, the coating may be treated with radiation to crosslink the coating to improve hydrolytic stability.

In an embodiment, the radiation utilized in the treatment of the coating may be UV light.

In an embodiment, the radiation utilized in the treatment of the coating may be gamma rays.

In an embodiment, the method of applying the nanocomposite coating may use at least one of paint sprayers, doctor knife, drawdown bars, rotogravure printing, and ink jet printing.

In an embodiment, a transparent self-assembling highly ordered polymer nanocomposite coating may be applied to protect OLED's from degradation that may be extremely impermeable to gases. The transparent self-assembling highly ordered polymer nanocomposite coating may include a water dispersible polymer having side groups on the backbone that may be polar or ionic and a bulky and a platy nanoparticle with a large aspect ratio that may have small ions or molecules on their surfaces that may readily be exchanged through ion exchange or ion-dipole bonding.

In an embodiment, the coating may be produced by sequentially applying the polymer followed by the nanoparticle iteratively.

In an embodiment, the nanoparticles of interest may be at least one of smectic clays or double metal hydroxides.

In an embodiment, the nanoparticles may be at least one of montmorillonite, hectorite, laponite, and hydrotalcite.

In an embodiment, the polymers may be polyvinyl pyrrolidone. In an embodiment, the polymers may be co-polymers of polyvinylpyrrolidone and/or polyvinylalcohol and/or polyvinylacetate and/or polycationic polymers such as polyamine styrene for the smectite nanopalticles and polyacrylic acid and co-polymers of acrylic acid, sulfated or phosphate polymers for double metal hydroxides.

In an embodiment, the solutions utilized to apply the coating may be less than 1% by weight of the polymer or nanoparticle.

In an embodiment, the solution concentrations may be 0.1% and 0.5% by weight.

In an embodiment, the coating may be treated with radiation to crosslink the coating to improve hydrolytic stability.

In an embodiment, the radiation utilized to treat the coating may be UV light.

In an embodiment, the radiation utilized to treat the coating may be gamma rays.

In an embodiment, the first coating composition comprises 0.1%-0.5% by weight of the water soluble polymer. Exemplary water soluble polymers include, but are not limited to, polyvinylpyrrolidone or polyvinyl alcohol. The first coating composition comprises, in some embodiments, the water soluble polymer dissolved in water.

In an embodiment, the second coating composition comprises 0.1%-0.5% by weight of the smectite clay. Exemplary smectite clays include, but are not limited to montmorillonite clays. In an embodiment, the second coating composition comprises the smectite polymer dispersed in water.

The bilayer may be formed by forming a first, polymer layer and drying the polymer layer. After drying the polymer layer, the second composition (having a smectite clay) is applied to the polymer layer and dried to form a bilayer. One or more additional bilayer coating layers may be formed on the initial bilayer coating using the first coating composition and the second coating composition as described above.

In an alternate embodiment, the first coating composition, which includes the water soluble polymer, can be mixed with the second coating composition that includes a smectite clay. The mixture may be used to coat an article by ink jet printing, spraying or dipping.

A variety of articles may be coated using the bilayer coating layer described herein. In a particularly useful example, one or more bilayer coatings may be applied to produce (e.g., fruits) to help extend the shelf life of the fruit by inhibiting contact of the produce with ambient oxygen.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features, and advantages here provided will become apparent to one with skill in the art upon examination of the following figures and detailed description. It is intended that all such additional systems, methods, features, and advantages that are included within this description, be within the scope of the appended claims and/or those claims filed later.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
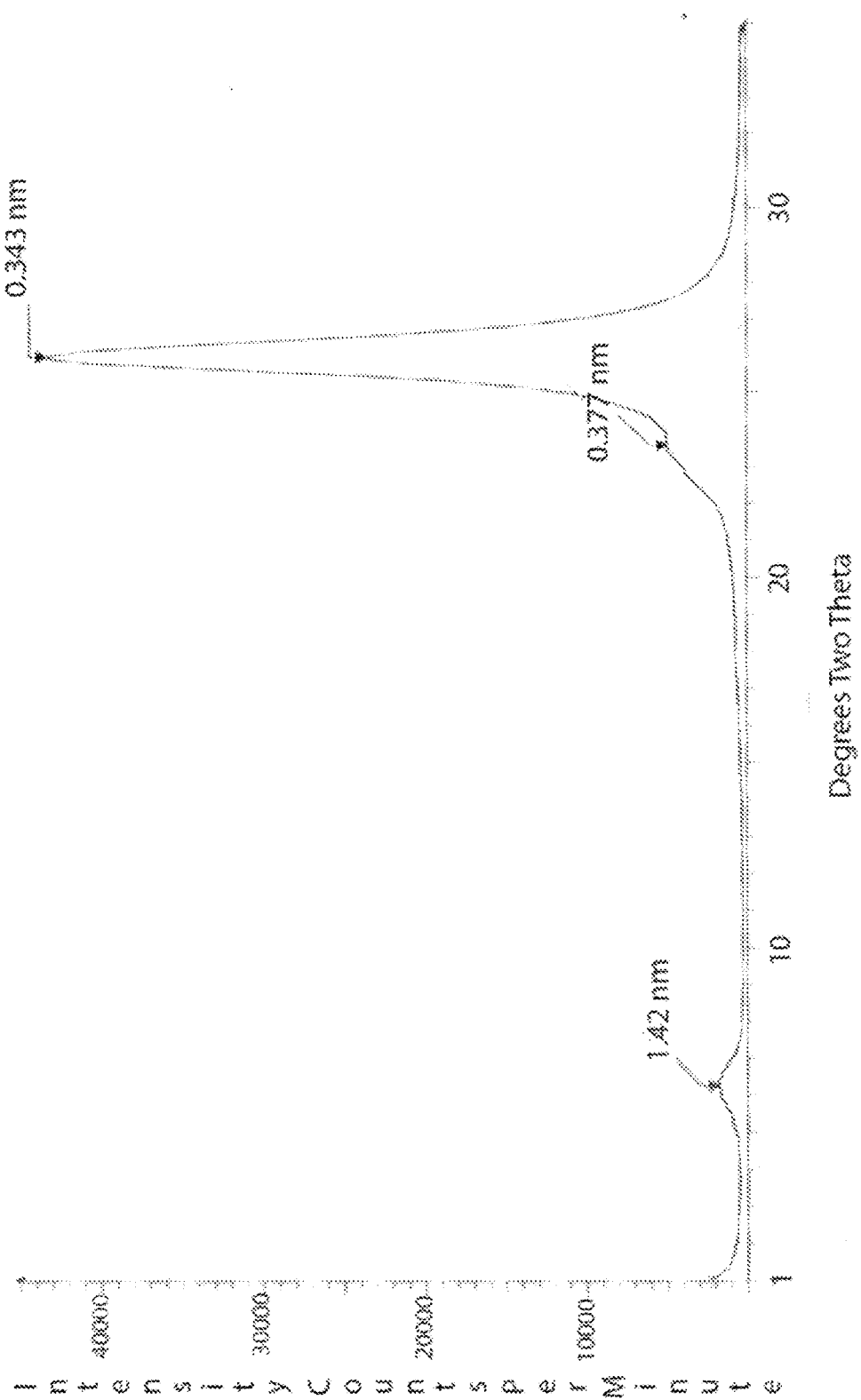
FIG. 1 is the x-ray powder pattern obtained on a 6 bilayer printed film using PVOH and MMT.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

In order to form the highly ordered self-assembled nanocomposite specific chemical components and mode of addition are used. The process of self-assembly appears to be driven by entropic forces. The entropic driver is due to the fact that every polymer molecule that intercalates into the clay displaces thousands of moles of small molecules or ions. Therefore, the entropy increase of the small molecules or ions is much larger than the entropy decrease of the polymer. In the broadest sense any nanoparticle that contains small molecules associated with the clay surface that can be displaced by bonding with a polymer will undergo an intercalation reaction. This single criterion, however, is not sufficient to result in the self-assembly of the highly ordered nanocomposite. In addition to this first criteria the polymer must also be configured in a way that makes it difficult for the polymer to coil tightly. This, in some embodiments, may be accomplished by using a polymer having a side group that is somewhat bulky yet polar enough to undergo bonding with the clay surface. In addition, the bulky side group when bonding to the clay surface orients the adjacent groups in a way that makes it difficult for the adjacent groups to bond with an adjacent clay platelet. If the polymer is too flexible the adjacent polar groups may bond between plates and essentially halt intercalation. An additional aspect to be considered is that the addition of polymer and nanoparticle should be added to the substrate sequentially. The best results are obtained when each layer is allowed to dry prior to applying the next layer. This process allows the surface tension of the fluid to aid in orienting the platy nanoparticles parallel to the surface of the substrate.

The nanoparticles useful in this invention have several specific characteristics that are critical. The first is that the nanoparticles are plate like having an aspect ratio of at least 30 and more preferably greater than 100. The plates should be able to undergo intercalation and exfoliation with the primary particle thickness (smallest dimension) being 1 nm. These particles must also be dispersible in water or water solvent mixtures. The preferred concentration of the dispersed particles should be less than 2% by weight. They should also have easily exchangeable small molecules or ions associated with the surface of the particle. One class of nanoparticles that fit these criteria includes magnesio and alumino silicates. Smectite clays and micro fine vermiculites are particularly useful. Among the smectite clays natural and synthetic montmorillonite and hectorite are preferred. In the case of the smectites there are substantial amounts of exchangeable cations on the surface that can be ion exchanged and typically the exchangeable cation has molecules of water hydrating the cation that can also be displaced. Another class of platy nanoparticles that satisfy the criteria are double metal hydroxides. The preferred double metal hydroxide is hydrotalcite. Hydrotalcite is a cationic clay which has exchangeable anions on the surface. The preferred anions are chloride or nitrate. Other anions that may be present include carbonate, sulfate, and phosphate.

Polymers that are useful should exhibit several characteristics. First, they should have polar or ionic groups that can interact with the nanoparticle forming an intercalated complex and displacing small molecule or ions previously bonded to the clay. Typical polar groups include carbonyls, hydroxides, ethers, and halogens. Typical ionic groups include carboxylic acids and protonated amines. Secondly the polymer may have polar side groups that are bulky. This is may be useful, in some embodiments, for two reasons. The first is that the bulky side group doesn't allow the polymer to coil as tightly and therefore the loss in entropy will be lower when it flattens out on the clay surface. The second function of the bulky group is that once the polar group bonds to the clay it orients the adjacent groups in such geometry that steric hindrance prevents it from bonding to any adjacent plate. Lastly the polymers must be dispersible in aqueous solution or mixtures of water and co-solvents. The preferred polymers of this invention are vinyl polymers. They can be homo- or block co-polymers. For smectite nanoparticles the preferred polymers are polyvinylpyrrolidone and block co-polymers of polyvinylpyrrolidone. The co-monomer to produce the block co-polymers with pyrrolidone can be any common vinyl monomer that will readily polymerize with vinylpyrrolidone. In addition, another preferred polymer for smectites is branched polyethylenimine or any vinyl polymer with an amine side group such polyaminostyrene or co-polymers of polyaminostyrene. The preferred polymers for use with hydrotalcite are anionic polyelectrolytes such as polyacrylic acid or co-polymers of polyacrylic acid. It has also been found that some, none bulky polymers such as polyethylene oxide and polyvinyl alcohol are also useful in forming ordered self-assembled nanocomposites.

The method of forming the nanocomposites is also controlled to promote self-assembly of the nanocomposite. Dilute solutions of the polymer and nanoparticles are made separately. The solutions should be less than 2% by weight and more preferably less than 1% or more preferably between 0.01 and 0.25% by weight. The solutions can be applied to the substrate in a number of ways but should always be applied as alternating layers with drying in between each layer. One layer of polymer and one layer of nanoparticle application is call a bilayer. This is somewhat a misnomer since the layer of polymer and the layer of nanoparticles spontaneously self-assemble into a highly ordered nanocomposite, but it is a convenient way to discuss the coating and compare it to systems that do not self-assemble. The layers can be applied using a doctor knife, a draw down bar, rotogravure printing, ink jet printing, and paint sprayer. The preferred method of application is ink jet printing.

The coatings once produced can later be cross-linked to produce films that are hydrolitically stable and improve their water vapor transmission rate. The crosslinking can be done with UV or other higher energy radiation as is commonly done in the art.

In an embodiment, a method of coating an article (e.g., produce such as fruit) includes: obtaining a first coating composition comprising a water soluble polymer and obtaining a second coating composition comprising smectite clay. The first and second coating compositions are then used to form a bilayer coating on the article by coating the article with the first coating composition and then coating the article with the second coating composition. To reduce waste and minimize costs both the first and second coating compositions are applied to the article using a spray coating process.

The first coating composition comprises 0.1%-0.5% by weight of the water soluble polymer, preferably 0.1%-0.3% by weight of the water soluble polymer. In an embodiment, the water soluble polymer is polyvinylpyrrolidone or polyvinyl alcohol. Polyvinyl alcohol is a preferred material for use in coating produce. Incorporating nanomaterial (such as smectite clays) into a polymer improves barrier effects. Polyvinyl alcohol ("PVOH") is a water soluble polymer known for its good gas-barrier properties and it has low cost. PVOH barrier properties however are sensitive to humidity and therefore a PVOH coating must be protected from the surrounding atmosphere. Low polarity gas molecules such as oxygen and carbon dioxide exhibit only weak interaction combined with the presence of crystalline regions reduces the permeability rates of the gases, resulting in the good gas-barrier properties of PVOH. Through complexation with another polymer or clay it was found that the oxygen barrier properties of PVOH could be modulated. A solvent is used in the first coating composition to dissolve the water-soluble polymer. Preferred solvents for the first coating composition are water and alcohols (e.g., ethanol)

The second coating composition comprises 0.1%-0.5% by weight of the smectite clay, preferably 0.15%-0.45% by weight of the smectite clay. To have effective hybrid organic/inorganic LbL coatings, the inorganic layer should have electrostatic attraction. Natural nanoclays, such as montmorillonite (MMT), with a negative charge on each platelet face can be used as such electrostatic inorganic materials. Montmorillonite (MMT) (e.g., montmorillonite sold under the tradename Cloisite Na+) is commonly used as anionic clay and it is part of the smectite group. This clay has a capacity of cationic exchange and is negatively-charged in deionized water. MMT can be exfoliated in water to produce 1-nm-thick anionic platelets. Furthermore, it is naturally abundant, safe, and has low cost. As a material for forming gas impermeable barriers it exhibits a high aspect ratio that creates a tortuous path for gas molecules moving through the polymer matrix, this creates a large diffusion length that lowers the permeability. Films having highly oriented clay platelets and combination properties of oxygen barrier and transparency have potential uses for food, biomedical, and electronics packaging applications. In an embodiment, the smectite clay is dispersed in water before being applied to the polymer coating layer.

The combination of the first coating composition (organic polymer layer) and the second coating composition (smectite clay layer) form a bilayer coating that offers both improved oxygen transmission rate values and transparency. To form the bilayer, the first coating composition is applied (preferably by spray coating) and dried on the article. Once dried the second coating composition is applied onto the first coating to form a bilayer coating on the article. A single bilayer coating can be used to protect the article, or a plurality of bilayers can be formed by sequentially coating the article with the first coating composition and the second coating composition.

In an alternate embodiment, the first coating composition, which includes the water soluble polymer, can be mixed with the second coating composition that includes a smectite clay. Alternatively, a single coating composition could be prepared by mixing a water soluble polymer and a smectite claim together in water. The mixture, or single coating composition, may be used to coat an article by ink jet printing, spraying or dipping. The resulting coating on the article may be dried by evaporation or heating.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

In this example a solution of polyvinylalcohol (PVOH) was made at 0.2% by weight. Likewise, dilute solutions of sodium montmorillonite were made at 0.2% by weight. These solutions were printed sequentially with an ink jet printer onto a MYLAR substrate in 2.5 cm squares. A total of 6 squares were printed with the first having one bilayer and the second having two bilayers continuing up to the sixth square that had six bilayers. The squares were then x-rayed in a powder diffractometer. FIG. 1 shows the x-ray powder pattern of the sample containing 6 bilayers. The large diffraction peak at about 25 degrees two theta is from the PET substrate as well as the smaller peak at about 23.6 degrees. The only peak arising from the coating is a broad weak peak at 6.28 degrees. This peak is characteristic of hydrated montmorillonite.

Example 2

Figure 2:
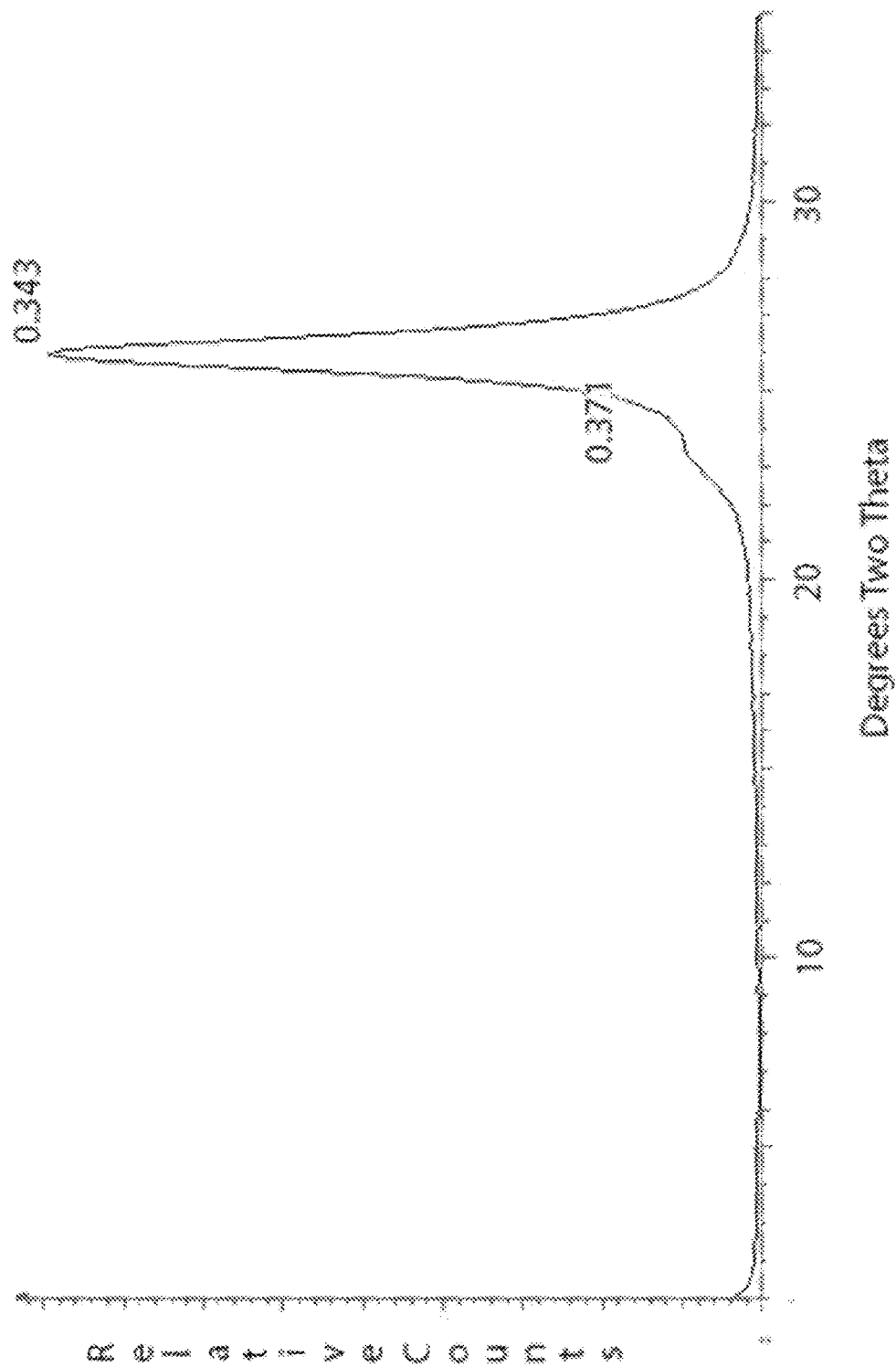
FIG. 2 is the x-ray powder pattern obtained on a 6 bilayer printed film using PEG and MMT.

In this example a solution of polyethylene oxide (PEO) was made at 0.2% by weight. Likewise, dilute solutions of sodium montmorillonite were made at 0.2% by weight. These solutions were printed sequentially with an ink jet printer onto a MYLAR substrate in 2.5 cm squares. A total of 6 squares were printed with the first having one bilayer and the second having two bilayers continuing up to the sixth square that had six bilayers. The squares were then x-rayed in a powder diffractometer. FIG. 2 shows the x-ray powder pattern of the sample containing 6 bilayers. The large diffraction peak at about 25 degrees two theta is from the PET substrate as well as the smaller peak at about 23.6 degrees. The only peak arising from the coating is a broad weak peak at around 4 degrees that is barely discernable. This peak is characteristic of montmorillonite intercalated with one layer of PEO.

Example 3

Figure 3:
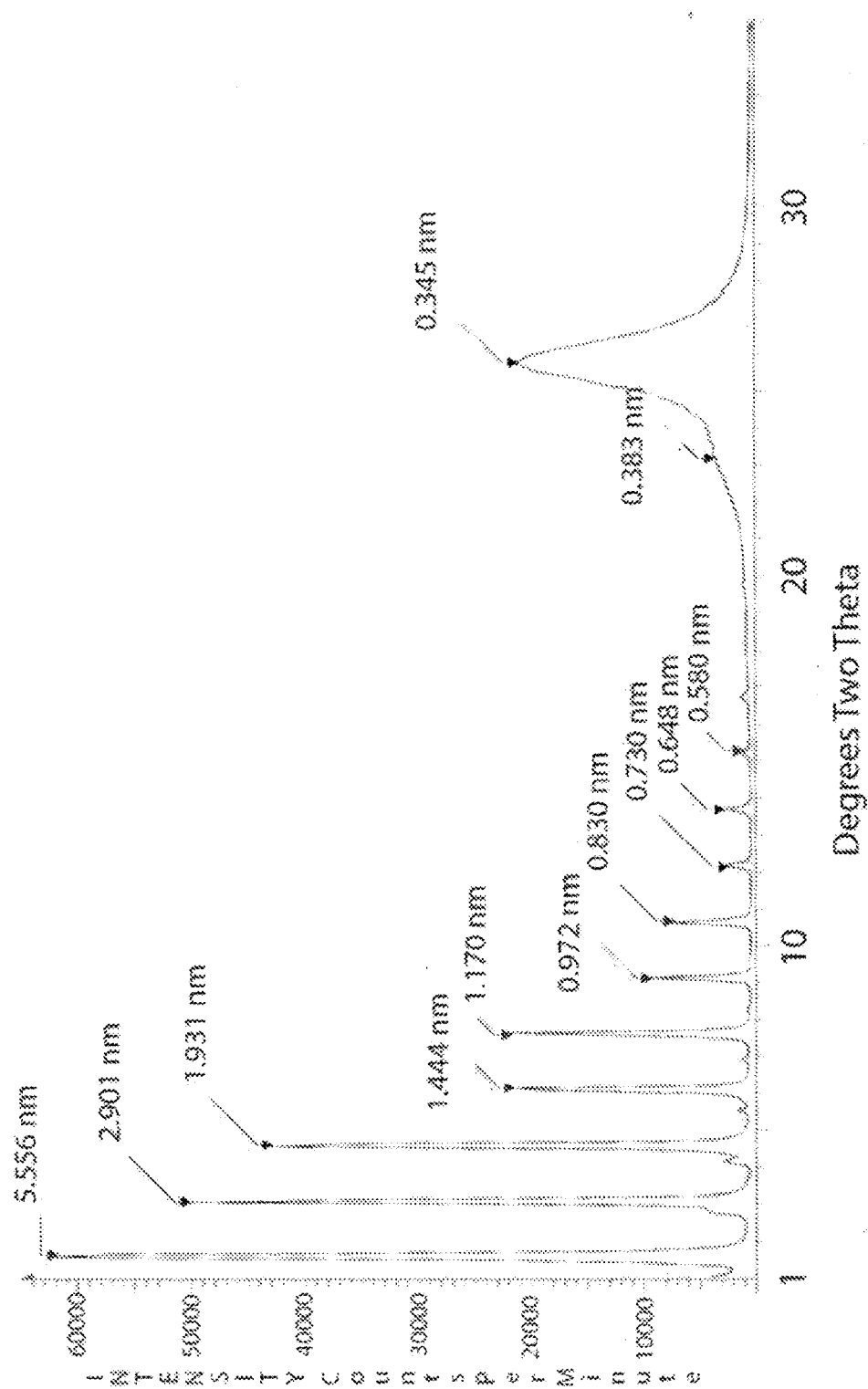
FIG. 3 is the x-ray powder pattern obtained on a self-assembled highly ordered 3 bilayer film using PVP and MMT.

In this example a solution of polyvinylpyrrolidone (PVP) was made at 0.2% by weight. Likewise, dilute solutions of sodium montmorillonite were made at 0.2% by weight. These solutions were printed sequentially with an ink jet plinter onto a MYLAR substrate in 2.5 cm squares. A total of 6 squares were printed with the first having one bilayer and the second having two bilayers continuing up to the sixth square that had six bilayers. The squares were then x-rayed in a powder diffractometer. FIG. 3 shows the x-ray powder pattern of the sample containing 3 bilayers. It can be seen that the peaks for the PET substrate are still present however they are much diminished compared to the previous examples. In addition, there are a series of very sharp intense peaks starting at 1.59 degrees two theta arising from an intercalated complex formed between the PVP and the clay. The first peak represents a d-spacing of approximately 55 angstroms and the other peaks at higher angle or orders of this first peak. At least 12 orders can be seen in the pattern. The high degree of order is also reflected in the intensity and sharpness of the peaks. In comparison to Example 1 the full with at half maximum was 1.5 degrees while this example the same parameter is 0.25 degrees. The peak in Example 2 is so weak and broad that no FWHM could be obtained. The highly ordered and highly intercalated structure of Example 3 forms spontaneously is totally unexpected.

Example 4

Figure 4:
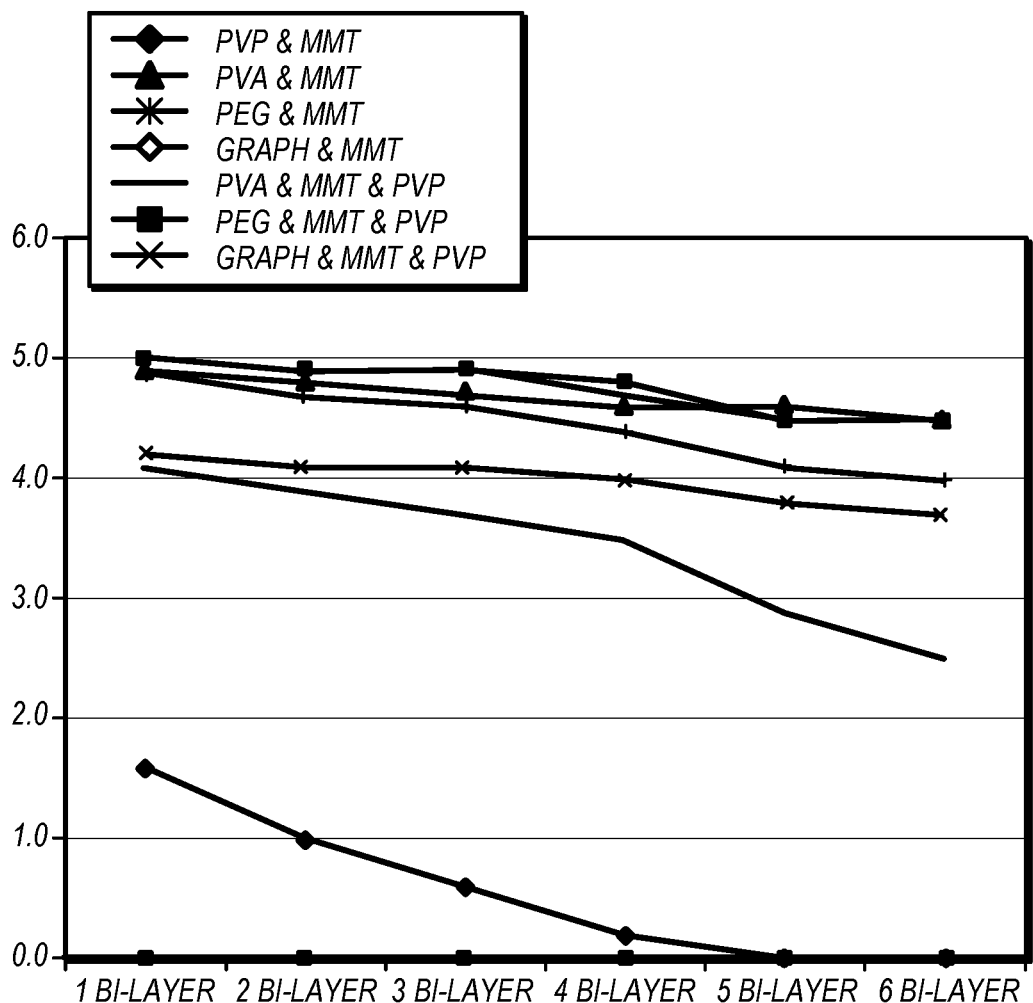
FIG. 4 is a graph of the gas barrier properties of films made with various combinations of polymers and MMT.
Figure 5:
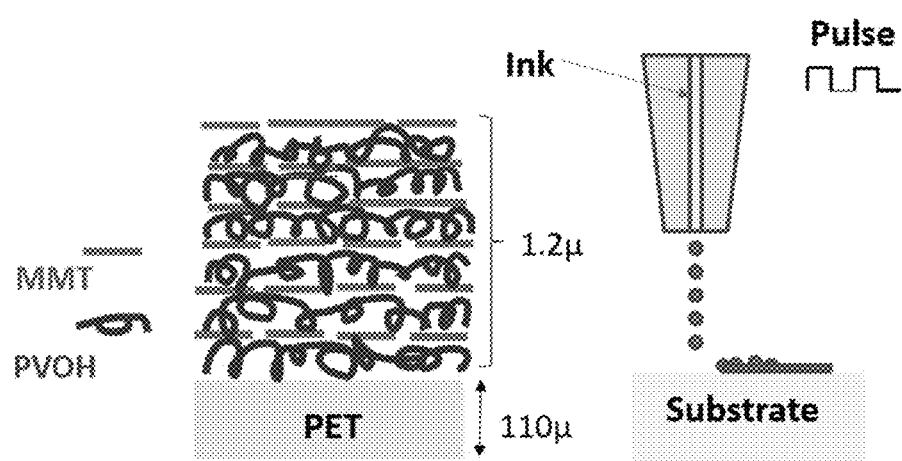
FIG. 5 depicts a schematic diagram of the experiment procedure by ink jet printer.
Figure 6:
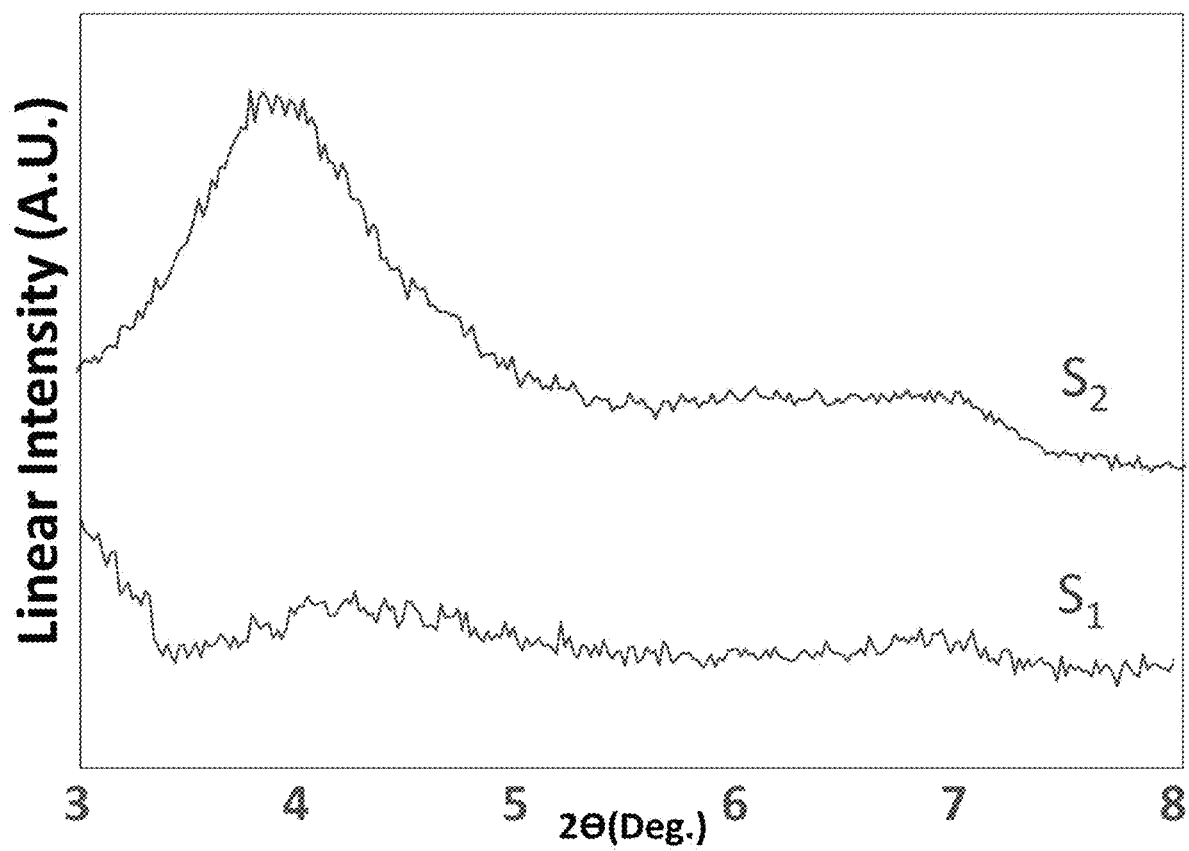
FIG. 6 depicts the position, intensity and broadness of the peaks of different composites with different amount of concentrations and layers.
Figure 7:
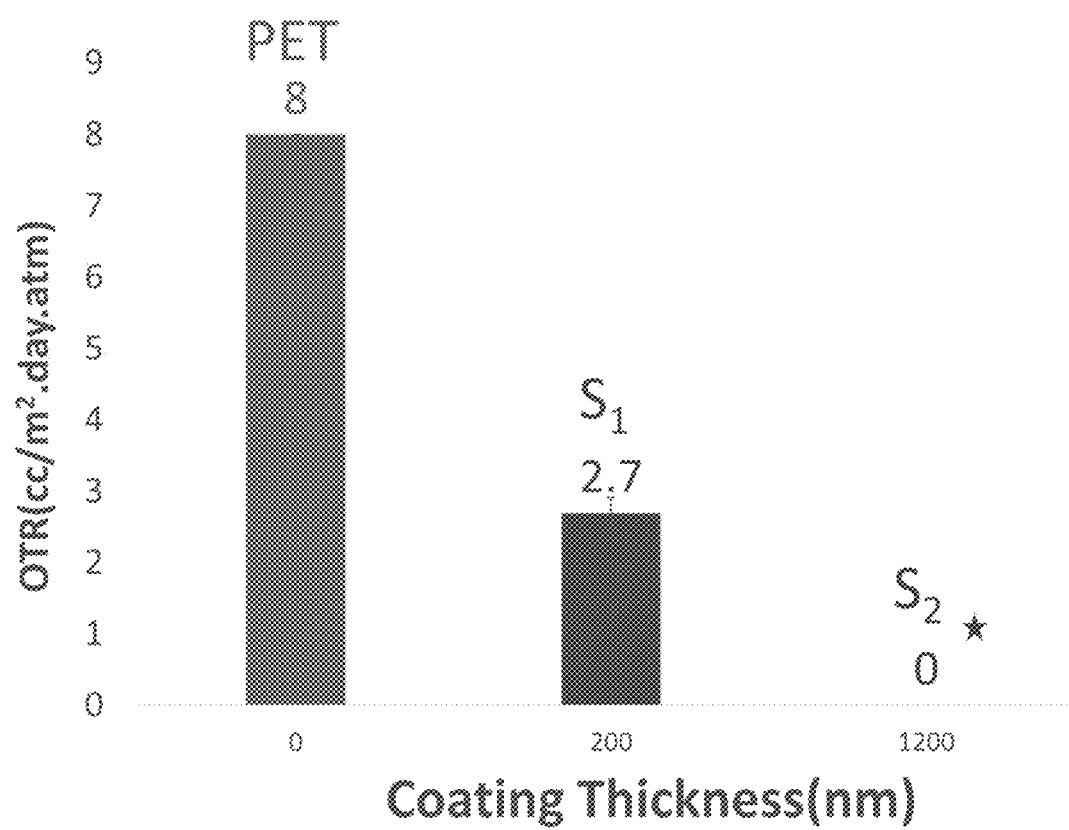
FIG. 7 depicts a bar graph showing the effect of different bilayer coating layers on OTR.
Figure 8:
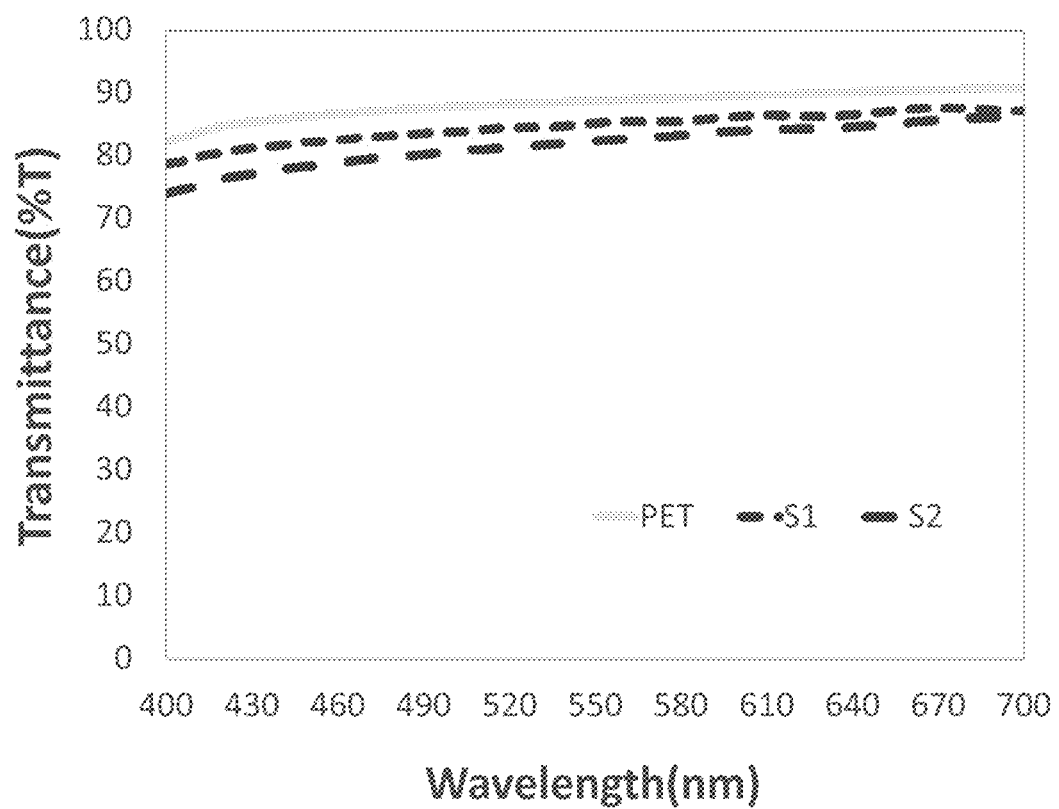
FIG. 8 depicts a transparency comparison of different concentration of PVOH-MMT and layers of printed-films.

The utility of this highly ordered self-assembling nanocomposite can be illustrated by measuring the oxygen permeability of the films produced in Examples 1, 2 and 3. All of the samples were placed in a Mocon oxytran instrument and the oxygen permeation rate determined. FIG. 4 depicts the results of those tests. The top four curves that contain PVA, PEG, Graphenol, and some where one layer of PVP is added first show very little if any improvement in oxygen permeability. The only curve that shows some slight improvement is the PVA with MMT pretreated with PVP. At 5 bilayers the gas permeability reaches the detection limit of the Mocon unit. At 4 bilayers the performance is equivalent to aluminized MYLAR.

Example 5

Strips of cotton linen approximately 2 inches wide and 12 inches long were cut from a T-shirt. One strip was sequentially sprayed with alternating solutions of 0.2% PVP and MMT until 10 bilayers had been applied. Untreated and treated linen strips were then suspended from a coat hanger with metal clips. Each strip was then exposed to a propane torch for a few seconds. The untreated linen burst into flames and was completely burned up in a few seconds. The linen sample that was treated started to combust but when the torch was removed self-extinguished stopping further combustion. Only about 20% of the linen was charred.

Example 6

Two compositions of PVOH were prepared at 0.1% and 0.3% by weight. Two suspensions of nanoclay MMT were prepared at 0.15% and 0.45% by weight were prepared by dispersing a measured quantity of the compound into the deionized water, followed by stirring for 5 hours before usage. A commercial grade of PVOH was supplied by Kuraray America, Inc. (KURARAY POVAL 3-80 with degree of hydrolyzation at 78.5%-81.5%). MMT (Montmorillonite; Cloisite $Na^+$) was obtained via donation from BYK. Two types of bilayers were produced. $S_1$ was a bilayer coating that was formed using the 0.1% by weight PVOH and 0.15% by weight MMT coating compositions. $S_2$ was a bilayer coating that was formed using the 0.3% by weight PVOH and 0.45% by weight MMT coating compositions.

For each composite, six square samples were created with 6.35 cm×6.35 cm for maximum throughput and efficiency. Producing polymer-clay nanocomposite films by spontaneous self-assembly was done by printing techniques. Different solutions were deposited with in Bilayers (BL) (where a bilayer, BL, refers to one polymer layer and an adjacent nanoclay layer) on Mylar (PET; Poly (ethylene terephlate) substrates by DOD (Note: we let each layer of deposition be dried by itself at room temperature, we made 2BL and 6BL). The PET sheet (8.5 in.×11 in., CG5000) has 110-micron thickness. PET film was acquired from 3M (Manufacturing Company). This film was generally used for transparencies in laser printers and inkjet and to promote ink adherence to the surface. It is coated with a water-soluble coating. This coating was removed and pre-cleaned before using by rinsing multiple times with isopropanol (IPA) and deionized (DI) water.

Deposition techniques were performed by Drop on Demand (DOD) inkjet printing. Inkjet-printed patterns resolution is controlled by several parameters, such as, the hydrodynamics of the jetted micro droplets, the wettability of the substrate, and the volatility of the ink constituents. The solutions of the individual polymers and MMT were placed in Fujifilm Dimatix DMP-2831 print heads with 100 dpi resolution. A print head contains 16 nozzles and they are spaced 254 µm apart. Each nozzle of print head can generate as small as 1 picoliter (pl) volumes drop and 1 pl cartridge can deposit features as small as 20 µm. FIG. 1 shows a schematic diagram of the experiment procedure by ink jet printer.

Deposited films by inkjet printing on the PET films were analyzed for their effectiveness as a gas barrier film, primarily focusing on oxygen gas barrier properties of the films. The analysis of the films was carried out using different material characterization techniques such as X-Ray Diffraction (XRD), surface Profilometer, and Mocon ox-tran 2/60. XRD was carried out using Bruker D8 focus powder X-ray diffractometer accompanied by Sol-X solid-state detector. The scanning angle was chosen from 3 to 8 degrees. Profilometer was used to determine thickness as well. Profilometry is used to measure the film thickness, samples were mounted on a Dektak XT profilometer (Bruker), which has a sensitive stylus which shows the surface profile. To measure the substrate thickness the PET Mylar sheet was measured alone and then again after deposition of the films. Films were deposited on the PET films and Oxygen Transmission Rate (OTR) measurements was carried out using Mocon Ox-Tran 2/60 analyzer at room temperature (23° C.) and 0% Rate of Humidity (RH). Also, the transparency (transmittance) was measured using a Shimadzu 2501PC UV-VIS spectrophotometer in range of visible light wavelength from 400 to 700 nm and the data were normalized to bare PET as a reference.

In this section, characterization results are analyzed to perform a comparative study on deposited films to determine best quality film for optimal reduction in Oxygen Transmission Rate (OTR).

X-Ray Diffraction

In literature, several examples demonstrate the relationship between crystallinity and permeability, in which higher crystallinity causes decreased permeability. Therefore, the films were analyzed using x-ray diffraction for determining whether any spontaneous self-assembly has occurred. In x-ray diffraction, shape and intensity based on reflections can be used to identify the structure of nanocomposites. The wide layer separation in the exfoliated nanocomposites causes the disappearance of any diffraction peak from the layers. In contrast, for intercalated nanocomposites, the increase of the distance between layers causes a peak at lower angles. PVOH-MMT films have an ordered system with several orders of reflections. The intensity and high amount of ordering are due to the self-assembly of ordered layers of clay intercalated by PVOH mediated and by ion-dipole bonding to the exchangeable cation on the montmorillonite surface. (Note: usually if there is not MMT pattern in x-ray pattern, it shows exfoliated or intercalated nanocomposite composed).

FIG. 2 shows the position, intensity and broadness of the peaks of different composites with different amount of concentrations and layers. All the patterns are characterized by the absence of the (001) diffraction peak (8.37° spacing ($d_{001}$) of 1.056 nm, for MMT), providing strong evidences that the clay nanolayers are exfoliated. In FIG. 2, for $S_2$, the (002) diffraction peak is at 3.62° with spacing of d=2.436 nm and the (003) diffraction peak at 7.07° with spacing of d=1.25 nm. In sample, $S_1$, we have a little amount of shifting and less intensity, because of having films in different layers and amount of weights. The effect of force-field-based modeling, which is related to polymers characters with having a bulky side group, helps to prevent a tightly coiled conformation in solution. The entropy decrease for every PVOH molecule when uncoiling to intercalate into the gallery is more than offset and the entropy increases by the water displaced during drying of the coating layers.

Oxygen Transition Rate

Both $S_1$ and $S_2$ had intercalated system based on x-ray analysis, but had different amounts of intensity. Gas permeability of printed-coated films was evaluated using MOCON OX-TRAN 2/60. The oxygen gas barrier property of nano-composite films was analyzed via permeation rate of films. PET substrate alone provides a good barrier to oxygen ($O_2$ permeability (PET) is in average 8 cc/m²·day·atm). Coating PET with a bilayer coating that incorporates smectite clay nanoparticles into the polymeric matrix is found to improve the oxygen barrier properties remarkably. FIG. 3 clearly shows $S_1$ nanocomposites deposited via Inkjet printing have 3 times better oxygen barrier capability than Mylar (PET) alone. Increasing the concentration of PVOH and smectite clay created a substantially zero transmission rate of oxygen through the film.

Transparency Measurement

Transparent packaging increases food salience and helps to monitor consumption. The more percentage of transparency, the more textures of inside can be seen in packages. Different films were mounted on UV-Vis spectrometer and analyzed in a wavelength range of 400-700 nanometers (nm) (visible light).

FIG. 4 shows a transparency comparison of different concentration of PVOH-MMT and layers of printed-films. That PET substrate alone has in average 88 percent transmittance for visible light. The PVOH-MMT films with different concentrations and layers show a remarkable transparency with an average light transmittance of 93% over the visible-light spectrum (400 nm to 700 nm). Table 1 shows comparison of using different materials in gas barrier applications that have different range of transparency (for having a fair estimation, we consider all materials are in average of 400-700 nm wavelength). In our case, using PVOH-MMT which has zero oxygen transmission rate has over 93% transparency.

TABLE II comparison of composite transmittance films used with different materials, OTR and transparency in range of visible light (400 nm-700 nm) via UV-Vis spectrometer.

| Materials | Techniques | OTR (cc m$^{-2}$ day$^{-1}$ atm$^{-1}$) | % Transparency |
| --- | --- | --- | --- |
| SiO$_x$N$_y$ | magnetic sputtering | 0.71 | 100 |
| PAM/MMT | dipping and drying | 0 | 90 |
| PVOH-LDH | dipping and drying | 0.72 | 90 |
| PVOH/MMT | Ink-jet printing | 0 | 93 |
| PEI/PAA/ PEI/MMT | Rinsing and drying | 0 | 95 |
| PEI/MMT | plasma | 1.6 | 88.5 |

Conclusion

In summary, a novel technique for having a self-assembling system was developed that uses spray coating techniques to form a bilayer coating having an interaction between the nanoparticle and polymer. The combination of oxygen barrier and transparency exhibited by this composite material makes it an ideal candidate for food and electronics packaging. Self-assembled nanocomposite films of PVOH-MMT shows excellent oxygen barrier (zero oxygen transmission rate) with small of thickness 1200 nm while providing transparency more than 93%. The coating materials used are approved by FDA (Food and Drug Administration) and they are generally recognized as safe materials to usage, making them outstanding alternative food packaging commercial applications.

Example 7

Materials

The polymers utilized in this paper were used as obtained from the supplier. Polyvinylpyrrolidone grades K-90 and K-60 were obtained from Sigma Aldrich. Polyvinyl alcohol grade 3-80 and polyethylenevinyl alcohol grade Type f(F101B) were both obtained from Kuraray. The polyethylene glycol was grade Pluracol 2000 obtained from BASF. The polyacrylic acid was obtained from Aldrich product #323667 lot #SLBK4124V. The smectites were used as received. Montmorillonite grade Cloisite Na+ and Laponite XLG were obtained from BYK additives. Hectorite grade SHCa-1 was obtained from the source clay repository of the Clay Mineral Society. And the Vermiculite, Microlite 903, was obtained from Grace Chemical.

Analytical Equipment

All x-ray diffraction measurements were made on a Bruker D8 focus powder diffractometer utilizing Cu K□ radiation. The Oxygen Transmission Rate was measured on a Mocon Ox-tran 2/60. The thickness of films were measured in two ways. The first was by profilometry utilizing a Dektak XT. The second was by utilizing ion beam etching with gallium in a FEI Helios 1200EXII SEM. Transparency was measured utilizing a Shimadzu 2501 PC UV—Visible spectrometer. The water content for raw materials and intercalates was determine on a TA instruments thermogravimetric analyser model Q50.

Sample Preparation

All film samples prepared for x-ray or OTR measurements were printed onto PET sheets with a Fujifilm Dimtrix DMP-2831 with print heads with 100 dpi resolution. Two types of ink were used. The first contained the polymer dissolved in deionized water at a concentration of 0.2% by mass. The second was made up of smectite clay at a concentration of 0.2% by mass in deionized water. The PET films were cleaned with isopropyl alcohol before printing. Areas of approximately 8×8 cm were printed with the first printing conducted with the polymer ink. The first printing was allowed to air dry before the same area was printed with the clay ink. This twostep printing is referred to as one bilayer. Successive bilayers of up to 6 were printed in some cases. These films were then cut into 5 cm diameter circles for Mocon measurements of OTR. The same samples were also utilized for wide angle x-ray diffraction. Transparency of selected samples was also determined on these same samples.

Results

With the unusually ordered nanostructured intercalates formed between PVP and MMT and their extreme barrier performance it is of interest to demonstrate that the self-assembly phenomena can be extended to other polymers and smectite clays. To facilitate this goal a series of polar polymers and several different types of smectite clays were reacted to form films on polyethylene terephthalate (PET) and their barrier properties to oxygen measured. The polymers studied include PVP, PVOH, PEG, PAAC, and EVOH. The smectite clays studied include montmorillonite (MMT), vermiculite (VMT), hectorite (HEC), and laponite (LAP). These clays were chosen due to their lateral dimensions with LAP being only 30 nm and VMT in the micron range and MMT and HEC intermediate in size.

Figure 9:
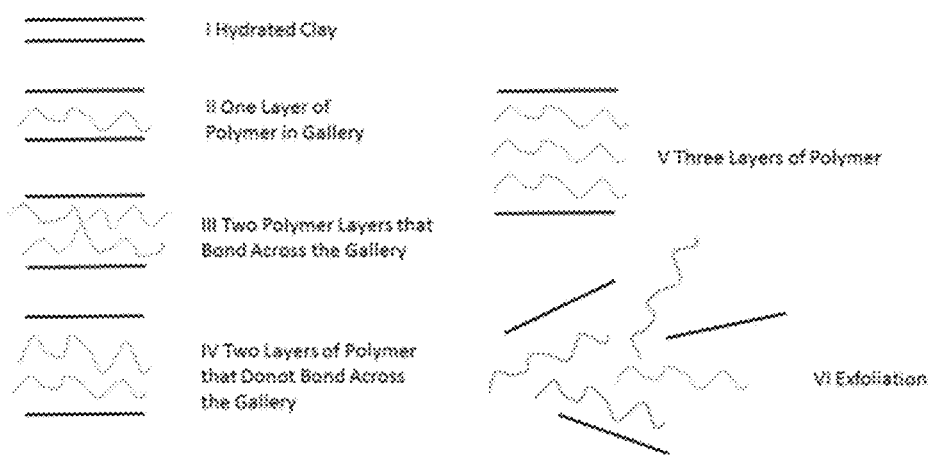
FIG. 9 gives a simplified scheme for the most likely structures encountered during intercalation.

In the first round of research the polymers were all utilized with MMT to form intercalated systems. There are number of possible intercalate structures that could form. FIG. 9 gives a simplified scheme for the most likely structures. The starting point is structure I which is the hydrated MMT which has a basal d-spacing of 1.2 nanometers. The second structure (II) is where one layer of polymer has intercalated into the gallery with typical d-spacings in the range of 1.4 to 1.9 nm. The third type of intercalate (III) contains two polymer layers that zigzag across the gallery and bond to opposite sides of the gallery. Structure III tends to have d-spacings in the 2.0 to 2.9 range and essentially glues the MMT layers together preventing exfoliation. These structures are often referred to as tactoids. Structure IV has two layers of polymer that independently associate with MMT layers and doesn't bridge across the gallery. This structure allows further intercalation of polymer (d-spacings in the range of 2.1 to 3.0). This leads to structure V where a third layer of polymer intercalates and mainly associates with the two polymers bound to the clay surfaces (d-spacing above 3.0 nm).

Figure 10:
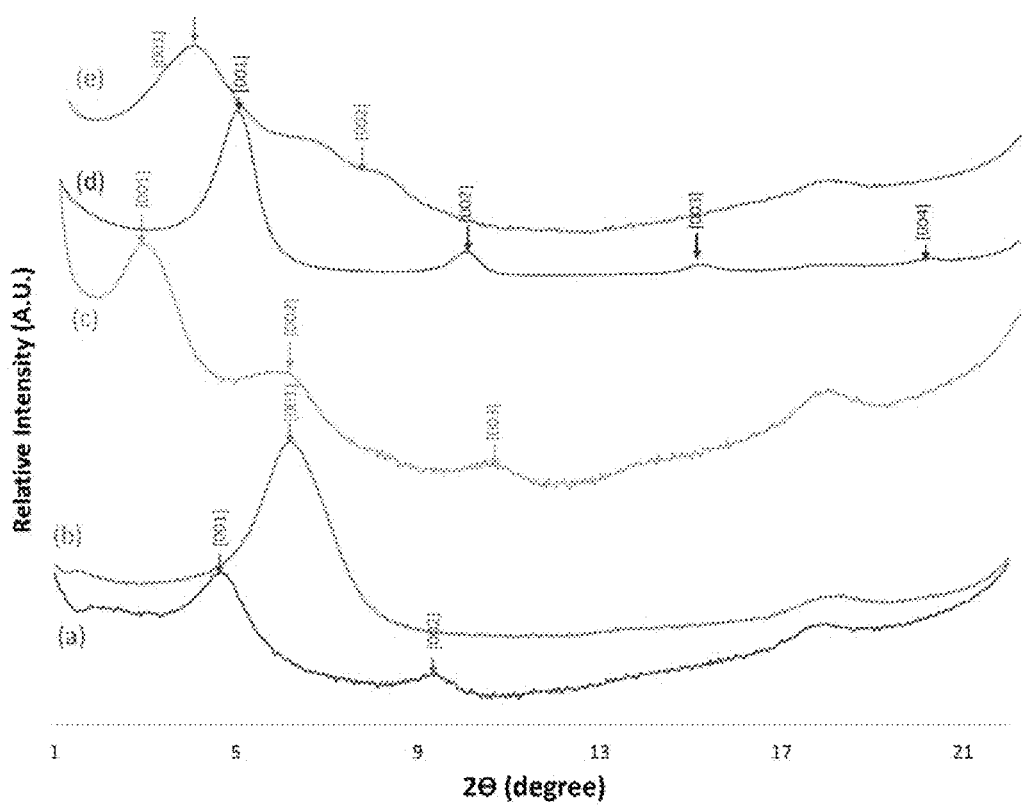
FIG. 10 depicts X-ray diffraction patterns for various polymers with MMT (a) PAA-MMT (b) EVOH-MMT (c) PVP-MMT (d) PEG-MMT and (e) PVOH-MMT.
Figure 11A:
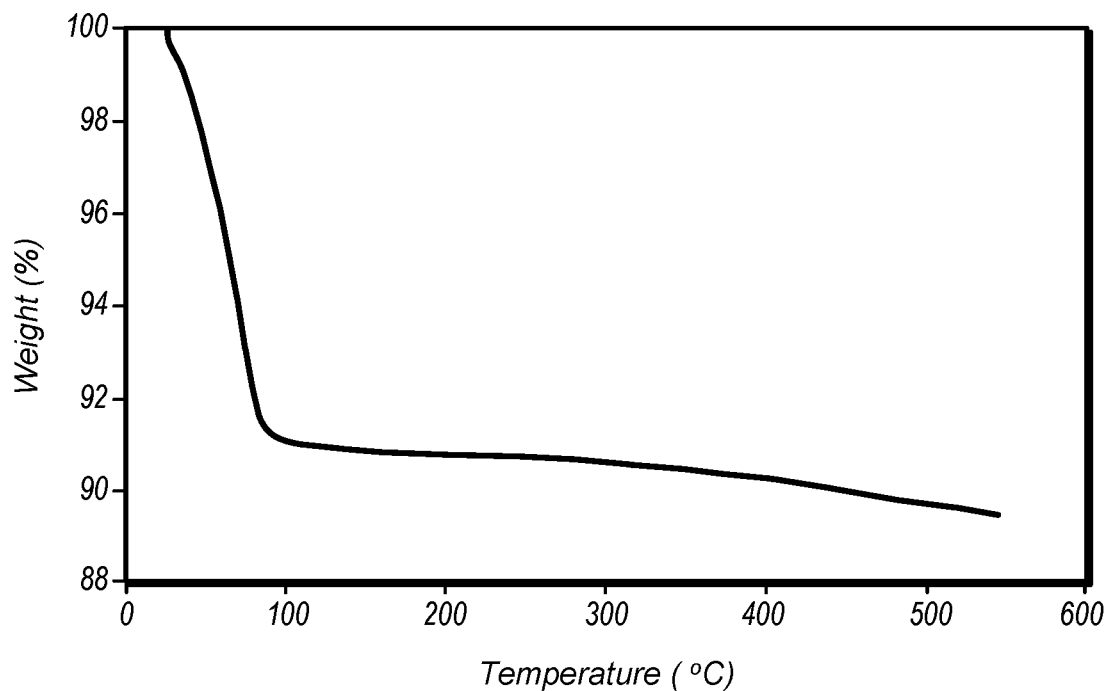
FIGS. 11A-B depict thermogravimetric analysis of water content of montmorillonite (11A) and montmorillonite/PVP intercalate film (11B) both air dried.
Figure 11B:
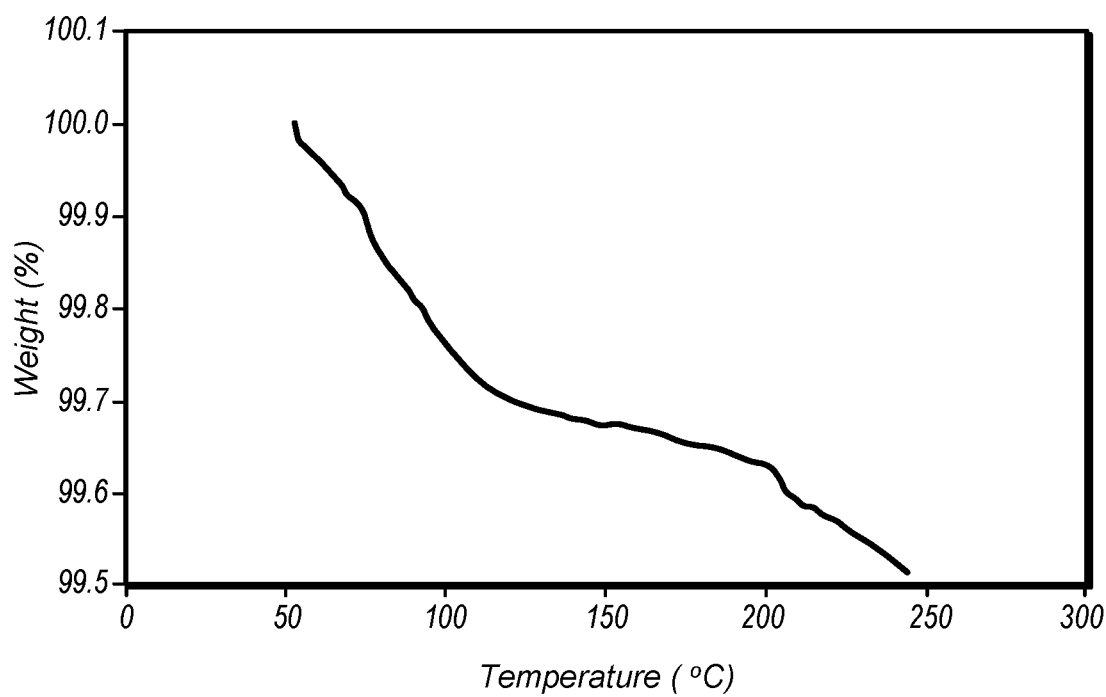

Films were ink jet printed onto PET sheets as substrates. The procedure was to print a layer of polymer followed by a layer of MMT. This is referred to as one bilayer. The films were then allowed to interact until they air dried. The x-ray diffraction patterns for these films can be seen in FIG. 10. It appears that all of the polymers have formed intercalated systems with MMT as evidenced by the shift in the basal d-spacing to lower two theta angles. MMT that is hydrated at normal humidity and room temperature will exhibit a basal d-spacing of approximately 1.2 nm. The PVP-MMT yields a highly ordered pattern exhibiting 4 to 5 orders of reflection with a basal spacing 3.1 nm. It is noteworthy that these films are nanostructured but bridge across the micron scale of the dried films. A typical bilayer in these films will be 2 to 3 microns thick with the self-assembled nanostructured intercalate throughout the whole thickness. Molecular modelling of this system indicates that this intercalated system (IV) has two layers of PVP in the gallery with the two being independently associated with the clay surface on the two sides of the gallery. The PVP/MMT system is unique in that the d-spacing is variable depending on the ratio of PVP to MMT. When PVP is mixed with MMT at 20 to 30% mass relative to MMT the d-spacing is about 2.3 nm which indicates one layer of PVP has intercalated. When the mass of PVP is raised between 40% and 60%, the d-spacing increases to 3.1 nm which would indicate two layers of PVP in the gallery each associating with an MMT plate. The mass ratio utilized in FIG. 9 is approximately 50%. Further addition of PVP continues to expand the gallery until the MMT is exfoliated (VI). PVP tends to be fairly linear due to the bulky pyrrolidone side group. Molecular modelling also indicates that once the polymer bonds to the exchangeable cations on a clay platelet the other pyrrolidone groups are sterically hindered from bonding across the gallery. PVP exhibits the strongest intercalation reaction that can be demonstrated by a simple experiment. In this experiment powdered MMT is placed in a bowl mixer and hydrated with about 30% by weight water in the first step. Even at this hydration level the MMT still behaves like a powder. In the second step 50% by weight of powdered K-15 PVP is dumped into the mixer. As the mixture is stirred it rapidly transitions to a dough consistency as the PVP intercalates and water begins to sweat out of the mass. It is difficult to determine how many water molecules are displace from the exchangeable cations on the clay surface. TGA analysis demonstrates that PVP alone contains about 15% water and the original clay contains about 9% water when both are air dried. The intercalated PVP/MMT film that have been inkjet printed and air dried contains approximately 0.5% water. This is strong evidence that the self-assembled intercalated system behaves very differently than the individual components and that the loss of water contributes to the driving force of the self-assembly. FIGS. 11A-B contain the TGA scans of MMT (FIG. 11A) and MMT/PVP (FIG. 11B) intercalate film both air dried. It must be noted that the two thermograms have very different weight loss scales.

The PVOH-MMT intercalate exhibits 3 to 4 orders of reflection with a basal spacing of 2.1 nm. This would indicate a bilayer structure with independent molecules coating both sides of the gallery or more likely the polymer zig zags across the gallery randomly and bonds with the other side (III). The intercalate formed with PEG-MMT also exhibits four orders of reflection and has a basal spacing of 1.8 nm. Due to the high degree of flexibility of PEG it is most likely that the PEG molecule is zig zagging (III) in the gallery and bonding across the gallery. For PVOH and PEG intercalates addition of more polymer doesn't increase the gallery spacing which strongly suggest structure III. The PAA-MMT complex only shows two orders of reflection and a basal spacing of 1.91 nm. This would indicate a similar molecular arrangement as seen in PEG and PVOH. The intercalate formed between EVOH-MMT is quite different from all the others. The EVOH-MMT intercalate only yields a single broad peak with a basal spacing of 1.44 nm. This is only enough space for one molecule to lay flat between the plates (II).

Figure 12:
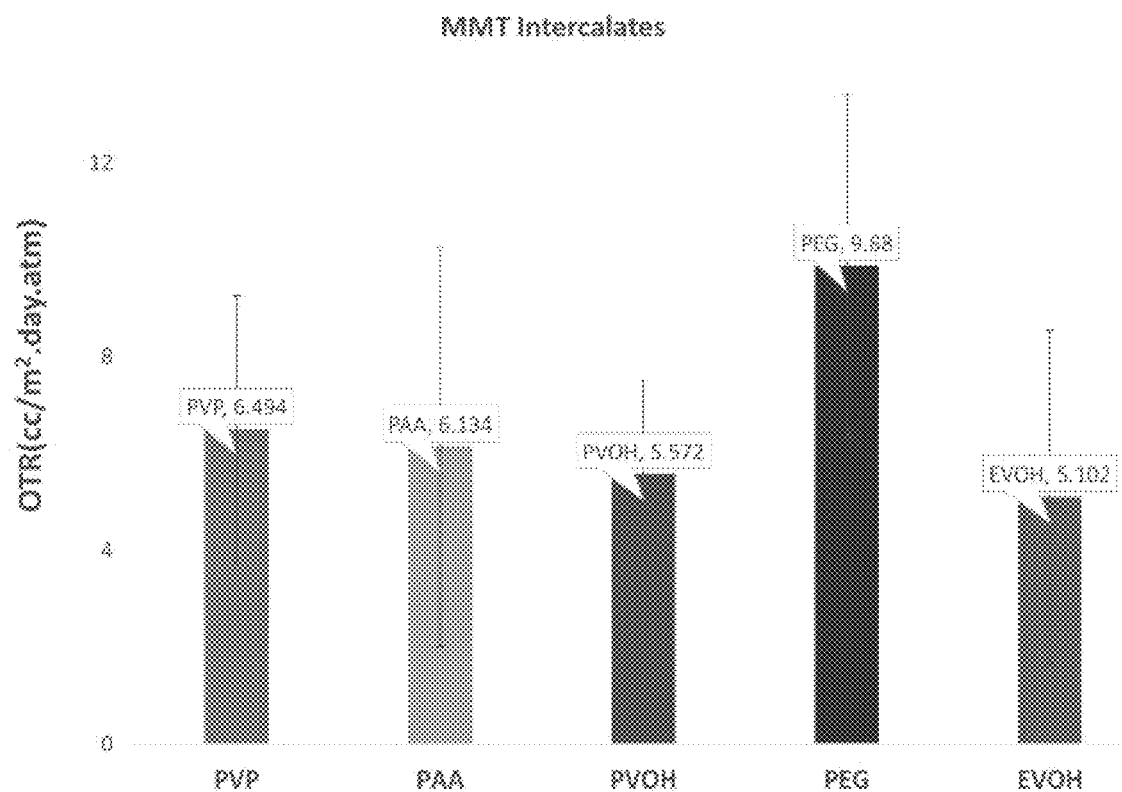
FIG. 12 depicts Oxygen Transmission Rate (OTR) for polymer-MMT intercalate films.

Each of the intercalated films were tested for their oxygen transmission rate (OTR). In this test a single bilayer was printed in each case. The OTR for all the films can be seen in FIG. 12. The OTR for the uncoated PET is 14 cc/m$^2$ day atm. Unexpectedly, all of the intercalated systems gave OTR's with better than a fifty percent reduction in gas permeability. This is particularly surprising since PVP and PAA are not known for being oxygen barrier polymers and PVOH and EVOH are known to be good barrier polymers but quite sensitive to humidity.

Figure 13:
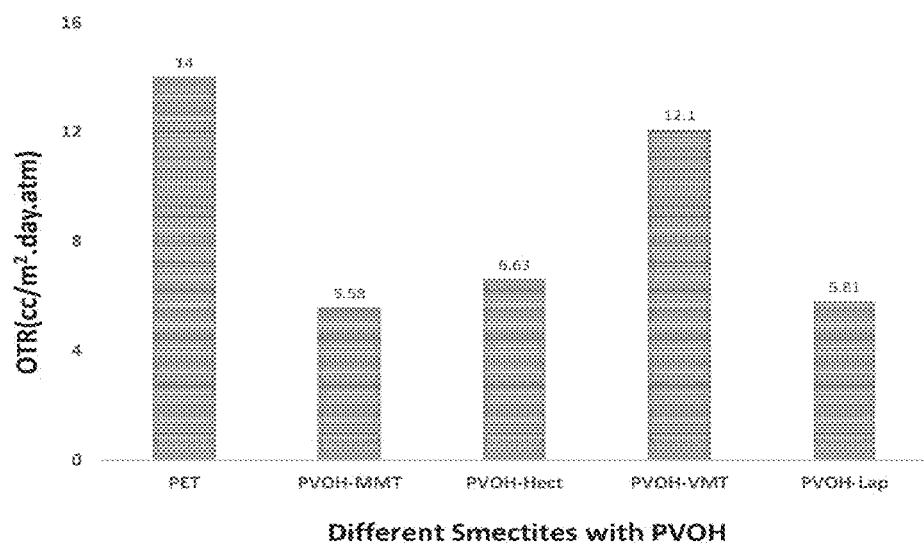
FIG. 13 depicts a comparison of OTR values for a series of different size smectite clays with PVOH.

These results could be an indication that the constrained polymer phenomenon is playing a role in the barrier performance of these intercalated systems especially in the case of PVP and PAA. The next step was to compare the performance of various smectites with different plate dimensions in order to test the tortuous path model. As before, films were produced utilizing the ink jet printer with one bilayer. Intercalates were produced utilizing PVOH with MMT, hectorite (HEC), vermiculite (VMT), and laponite (LAP). These four clays were chosen to have a wide variation of lateral dimensions. LAP is very small at 30 nm, HEC at 80 nm, MMT at 150 nm and VMT at 1000 nm. This series is a good test of the tortuous path model of Nielsen (L. E. Nielsen, J. Macromol. Sci., Part A, 1967, 5, 42-92) since the lateral dimensions of the particles strongly affect the gas permeability with small particles having least effect. Utilizing average lateral dimensions for VMT, MMT, and LAP of 1000, 150 and 30 nm respectively the relative reduction in gas permeability calculated from Nielsen would be factors of 250, 38 and 9 respectively. FIG. 13 contains the OTR results for this series. The LAP complex performed as well as the MMT and the VMT performed the worst. The VMT results can be explained by the fact that the x-ray diffraction pattern indicates that the VMT was only partially intercalated with PVOH having a broad peak at 2.7 nm for the intercalate and a very sharp peak at 1.4 nm for the unintercalated VMT. In addition the print head of the ink jet printer kept getting stopped up due to the large particle size of VMT. The VMT results can be discounted based upon these factors. The relative performance of the MMT and LAP are much more difficult to rationalize using just the tortuous path model for barrier properties. The very unusual performance of LAP however can easily be accommodated with a modified Nielsen model where the effect of constrained polymer is accounted for in the calculations. The constrained polymer effect is also consistent with the TGA data reported earlier. Since PVOH is well known to be a good oxygen barrier material in its own right it is important to demonstrate that the polymer by itself is not a good barrier material alone.

Figure 14:
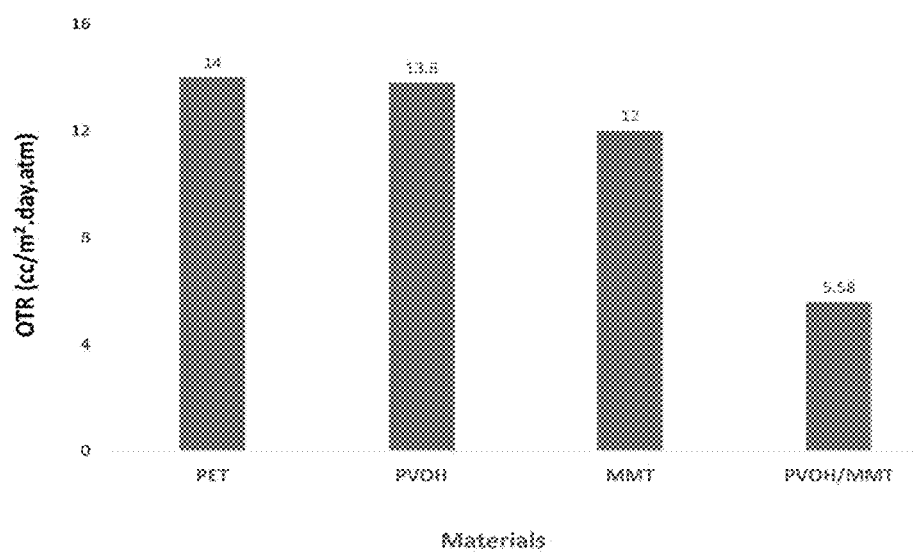
FIG. 14 depicts a comparison of OTR values for PET coated PVOH, MMT, and PVOH-MMT.

FIG. 14 contains a comparison of OTR values for uncoated PET, PET coated with PVOH, PET coated with MMT, and PET coated with PVOH-MMT intercalate. In each case a single bilayer of the composite was printed on the film. In the case of the pure PVOH and the MMT the area was printed twice to adjust the thickness to be as close to the same as possible for the bilayers. The drying conditions of humidity and temperature were maintained equally for all the films.

Figure 15:
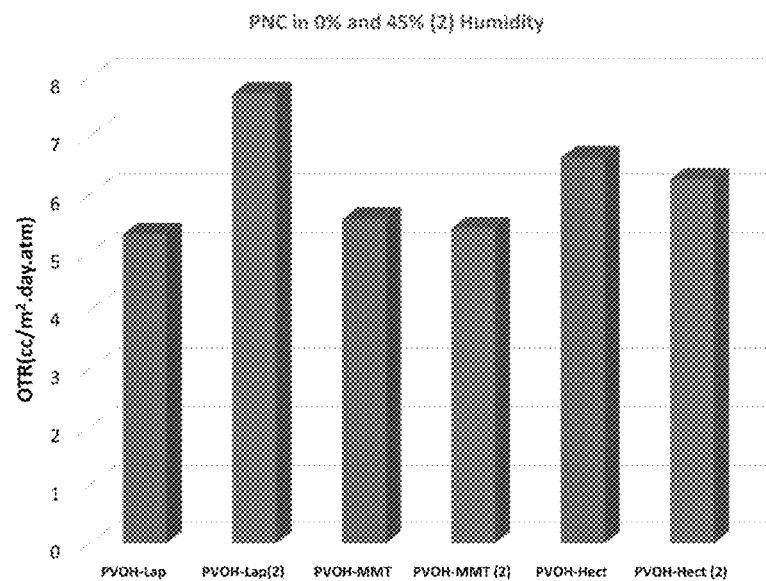
FIG. 15 depicts a comparison of OTR for several PVOH intercalates at 0% (red) and 45% (blue) relative humidity.

It is clear from the OTR results taken under the exact same humidity conditions that PET coated with pure PVOH has no effect on the gas permeability. Additionally PET coated with MMT did not statistically improve the OTR. It is clear then that the intercalated complex behaves quite differently than any prediction of any additive effect of the two pure systems. It is well established that PVOH films are extremely sensitive to humidity when measuring OTR. FIG. 15 contains the OTR result measured for several minerals intercalated with PVOH at 0% and 45% relative humidity. In the case of the MMT and HCT intercalates the humidity had no effect. The only system affected was the small particle laponite. For the PVOH-MMT the OTR at 100% relative humidity did not change at all. This again indicates that the constrained polymer effect is at work in these systems.

Figure 16:
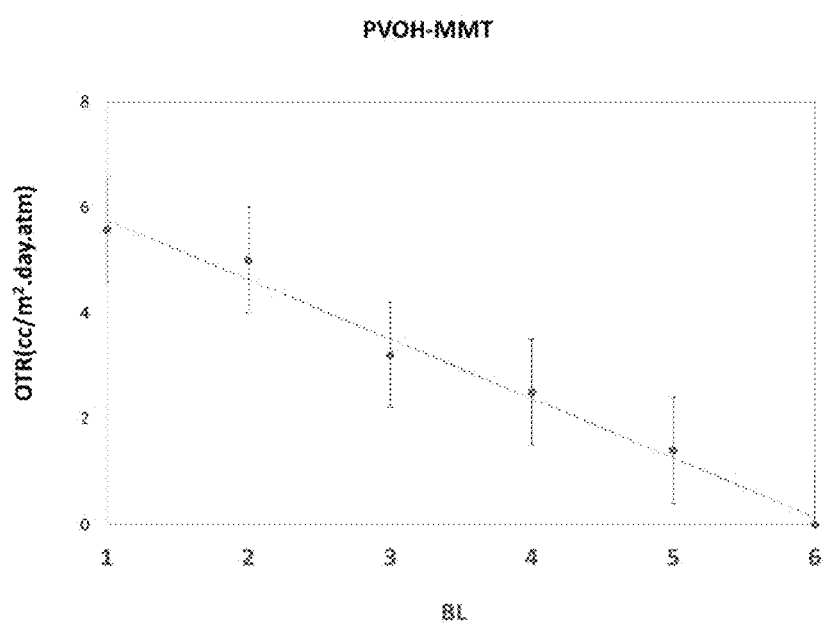
FIG. 16 depicts the effect of film thickness on OTR for PVOH-MMT film.

The last variable of interest in these intercalated systems is the effect of film thickness. In these experiments a series of films were printed in successive number of bilayers going from one to six with subsequent measurement of OTR for each film. The results of these experiments are contained in FIG. 16. At 6 bilayers the film thickness is 12 microns. It is clear from the graph that extremely good gas barrier performance can be obtained with these intercalated systems. To put these values in context the gold standard in packaging is aluminized PET or biaxially oriented polypropylene, which typically has an OTR just below 1 cc/m$^2$ day atm, these films can clearly surpass that performance and are quite transparent. The light transmission rate for uncoated PET is 93% while the PVOH-LAP coated is also 93%. When observing the coated film from different angles it actually appears to be more transparent. This effect is most likely due to surface roughness that exists on the surface of the PET sheets that is largely eliminated with the film drying and nanoparticles filling the imperfections.

Figure 17:
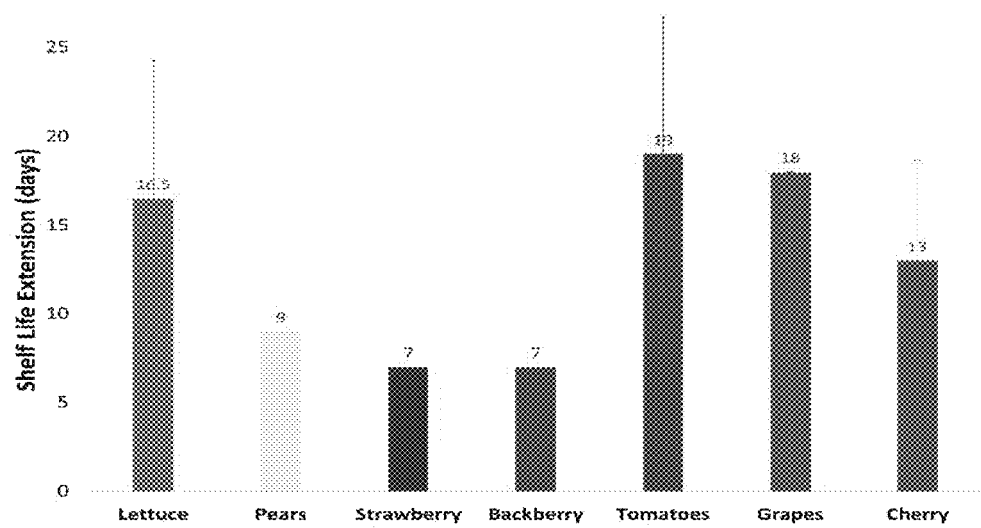
FIG. 17 depicts a graph of shelf life extension in days for selected fruits and vegetables.

It is clear that these intercalated systems could be useful for replacing food packaging to extend shelf life of food. This however would simply be an incremental step in improving food packaging, with the advantage of having high barrier properties with transparency. The major problem of disposal of the packaging still remains. To potentially mitigate this problem, an approach would be to coat fruits and vegetables directly thus eliminating packaging altogether. For this approach to work the coating must be edible or be amenable to removal by washing. It is fortuitous that PVOH and smectite clays are both classified as GRAS (Generally Recognized as Safe) by the Food and Drug Administration. Currently there are many products that contain PVOH or Montmorillonite that are consumed daily by consumers. In order to test this approach a number of fruits and vegetables were purchased at the local market and one set of each was coated by spraying them with a solution containing both PVOH and MMT rather than ink jet printing and one set left uncoated. The different fruits and vegetables were then stored at room temperature and observed for mold, discoloration, or rotting. FIG. 17 contains the results of these tests for a variety of produce. Each of the bars in the graph represents the number of days that the respective fruit or vegetable remained without blemish past the point at which the uncoated produce was judged to be unacceptable.

The zero point in this graph is the time that the uncoated fruit or vegetable was deemed to be unacceptable for human consumption. It is clear from these results that in all cases tested the coated produce lasted longer than the uncoated. The average extension was a factor of two in shelf life. It is reasonable to assume that if the produce could be coated when harvested the extension of shelf life could be larger.

Discussion

The extension of the self-assembling polymer/clay nanocomposites has been demonstrated for a variety of polymers and smectites. These intercalated systems yield extraordinary gas barrier performance that appears to exceed that which would be expected from a simple tortuous path model for gas diffusion. The general high barrier performance, the lack of humidity sensitivity, the loss of water upon intercalation, and the lack of performance difference between vastly different particle sizes would indicate that the polymers are behaving differently in these nano-intercalated systems relative to the behaver of bulk polymer. In these intercalates the polymers are highly constrained due to interactions with the clay surface and due to the platy nature of the clays tend to become highly oriented due to surface tension effects during drying. The self-assembly occurs across the micron scale but is ordered at the nanoscale. This self-assembly appears to be driven by entropy. When the polymers intercalate they must decrease their entropy by uncoiling and lying flat in the gallery. This loss in entropy is more than compensated for by the increase in entropy experienced by the waters that are displaced from the exchangeable cations on the clay surface. For each mole of polymer intercalated there are hundreds if not thousands of moles of water that are displaced since depending on the molecular weight of the polymer can bond to many cations. The net entropy therefore increases substantially. It is also clear that these intercalated films have utility in shelf life extension for traditional food packaging but also as a direct coating on produce. This not only helps mitigate the problem of food spoilage but also the problems of packaging waste.

Conclusions

A new class of intercalated complexes of polymers and smectites has been demonstrated. These intercalates are self-assembling across the micron length scale and appear to be entropically driven. They exhibit extraordinary gas barrier properties and are transparent. The intercalated systems exhibit behaver that is very different than the individual systems. In particular, the polymers appear to behave very differently from bulk polymer due to the constraints of intercalation into the clay gallery. Several of the systems are considered as GRAS by the FDA and therefore edible. These systems applied to produce yield substantial increases in shelf life and eliminated packaging waste and disposal issues. These intercalates could have potential in other areas such as protection for organic light emitting diodes that are very sensitive to oxidation.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of coating an article comprising:
    forming a coating composition by mixing a first composition of a water-soluble polymer in a solvent with a second composition of a smectite clay in water, wherein the water-soluble polymer comprises bulky side groups attached to a backbone of the water-soluble polymer and the first composition includes 0.1%-0.5% by weight of the water-soluble polymer, wherein the second composition includes 0.15%-0.45% by weight of the smectite clay, and wherein the water-soluble polymer comprising bulky side groups is selected from the group consisting of polyvinylpyrrolidone and block co-polymers of polyvinylpyrrolidone; polyethylenimine, polyaminostyrene or co-polymers of polyaminostyrene, and polyacrylic acid or co-polymers of polyacrylic acid; and
    forming a coating layer on the article by the method of:
        applying the coating composition to the article; and
        allowing the coating composition to dry and self-assemble to form an intercalated barrier coating on the article, wherein the intercalated barrier coating has a structure that is ordered with multiple orders.

2. The method of claim 1, wherein the coating composition is applied using a spray coating process.

3. The method of claim 1, wherein the water soluble polymer is polyvinylpyrrolidone.

4. The method of claim 1, wherein the water-soluble polymer comprises polyvinyl pyrrolidone or co-polymers of polyvinylpyrrolidone and polycationic polymers.

5. The method of claim 4, wherein the polycationic polymer is polyamine styrene.

6. The method of claim 4, wherein the polycationic polymer is a sulfated or phosphated polymer.

7. The method of claim 1, wherein the smectite clay comprises montmorillonite.

8. The method of claim 1, wherein the intercalated barrier coating comprises multiple intercalated layers of the water-soluble polymer and the smectite clay.

9. The method of claim 1, wherein the first composition is free of polyethylene oxide.

10. A method of coating an article comprising:
    forming a coating composition by mixing a water-soluble polymer and a smectite clay; wherein the water-soluble polymer is polyvinyl alcohol with degree of hydrolyzation between 78.5% and 81.5%; and forming a coating layer on the article by the method of:
applying the coating composition to the article; and
drying the coating composition to allow the coating composition to self-assemble and form an intercalated barrier coating on the article, wherein the intercalated barrier coating comprises multiple intercalated layers of the water-soluble polymer and the smectite clay.

11. The method of claim 10, wherein the coating composition is applied using a spray coating process.

12. The method of claim 10, wherein the smectite clay comprises montmorillonite.

13. The method of claim 10, wherein the coating composition comprises 0.1%-0.3% by weight of the water-soluble polymer.

14. The method of claim 10, wherein the coating composition comprises 0.15%-0.45% by weight of the smectite clay.

15. The method of claim 10, wherein the intercalated barrier coating has a structure that is ordered with multiple orders.

\* \* \* \* \*